United States Patent [19]

Nomura et al.

[11] Patent Number: 5,097,391
[45] Date of Patent: Mar. 17, 1992

[54] CERAMIC MULTILAYER CHIP CAPACITOR AND METHOD FOR MAKING

[75] Inventors: Takeshi Nomura, Matsudo; Masaaki Ikeda, Narita; Shigekazu Sumita, Narita; Yukie Nakano, Narita; Kousuke Nishiyama, Narita; Michio Abe, Yachiyo, all of Japan

[73] Assignee: TDK Corporation, Tokyo, Japan

[21] Appl. No.: 599,414

[22] Filed: Oct. 18, 1990

[30] Foreign Application Priority Data

Oct. 18, 1989 [JP] Japan .................. 1-271224
Oct. 18, 1989 [JP] Japan .................. 1-271225
Oct. 18, 1989 [JP] Japan .................. 1-271226

[51] Int. Cl.⁵ .................. H01G 4/12; C04B 35/46
[52] U.S. Cl. .................. 361/321; 29/25.42; 264/61
[58] Field of Search .................. 501/134-138; 361/320, 321; 264/63, 64, 61; 29/25.42; 252/63.2 BT

[56] References Cited

U.S. PATENT DOCUMENTS

| 4,097,911 | 6/1978 | Dorrian | 361/305 |
| 4,115,493 | 9/1978 | Sakabe et al. | 264/61 |
| 4,241,378 | 12/1980 | Dorrian | 29/25.42 X |
| 4,604,676 | 8/1986 | Senda et al. | 361/321 X |
| 4,612,600 | 9/1986 | Hodgkins | 501/138 X |
| 4,988,650 | 1/1991 | Takagi et al. | 501/134 |

FOREIGN PATENT DOCUMENTS 143512 8/1983 Japan .
27518 2/1984 Japan .
12375 3/1988 Japan .

Primary Examiner—Donald A. Griffin
Attorney, Agent, or Firm—Oblon, Spivak, McClelland, Maier & Neustadt

[57] ABSTRACT

In a ceramic multilayer chip capacitor comprising alternately stacked internal electrodes of Ni or Ni alloy and dielectric layers, an oxide layer having a different composition from the dielectric layer is formed on the periphery of each internal electrode. The dielectric layer consists essentially of grains and a grain boundary phase, the percent area of the grain boundary phase being up to 2% of the area of a cross section of the dielectric layer. The capacitor is prepared by alternately stacking Ni or Ni alloy and a dielectric material in layer form, firing and then heat treating the stack under predetermined oxygen partial pressures. The dielectric material is a barium titanate base oxide material. The capacitor has a long effective life.

29 Claims, 6 Drawing Sheets

Ni

Ni

12 μm

F I G. 11
12 μm

CERAMIC MULTILAYER CHIP CAPACITOR AND METHOD FOR MAKING

This invention relates to ceramic multilayer chip capacitors and a method for preparing the same. More particularly, it relates to an improvement in the dielectric layer of ceramic multilayer chip capacitors.

BACKGROUND OF THE INVENTION

Multilayer ceramic chip capacitors are generally manufactured by alternately applying an internal electrode-forming paste and a dielectric paste in layers by conventional green sheet, printing and other methods and simultaneously firing the resulting layers as an integral stack. Palladium (Pd) and palladium alloys have been widely used as the internal electrodes although relatively inexpensive nickel (Ni) and nickel alloys are now used as a substitute for expensive palladium.

Undesirably, internal electrodes of Ni or Ni alloy are oxidized if fired in the ambient air. To prevent oxidation, the stack after binder removal is fired under an oxygen partial pressure lower than the equilibrium oxygen partial pressure of Ni and NiO. The dielectric layer is oxidized again by a further heat treatment. In this case, $SiO_2$ is added as a mineralizer for densification of the dielectric material while $Al_2O_3$ is often added incidentally. The grain boundary phase components including BaO and $TiO_2$ as well as these components are sources for a loss of insulation resistance upon firing in a reducing atmosphere.

Mn addition and Ca substitution are useful measures for preventing a loss of insulation resistance due to reduction of the dielectric layer.

However, multilayer chip capacitors having internal electrodes of Ni or Ni alloy have an extremely short life of insulation resistance and are less reliable as compared with multilayer chip capacitors having internal electrodes of Pd fired in the atmospheric air.

SUMMARY OF THE INVENTION

Therefore, a primary object of the present invention is to provide a reliable ceramic multilayer chip capacitor having internal electrodes of Ni or Ni alloy in which the effective life is extended by improving the dielectric layer thereof.

The present invention provides a ceramic multilayer chip capacitor comprising internal electrodes of nickel or a nickel alloy and dielectric layers stacked alternately with the internal electrodes. According to a first aspect, an oxide layer having a different composition from the dielectric layer is formed on the periphery of each internal electrode.

Preferably, the oxide layer contains 1 to 99% by weight, calculated as MnO, of manganese oxide, 0.1 to 99% by weight, calculated as $P_2O_5$, of phosphorus oxide, or 0.1 to 99% by weight, calculated as $Fe_2O_3$, of iron oxide or a mixture thereof.

Preferably, the oxide layer has a thickness of 0.01 to 1 μm. The oxide layer often includes a first layer containing 0.1 to 99% by weight, calculated as $P_2O_5$, of phosphorus oxide and a second layer containing 1 to 99% by weight, calculated as MnO, of manganese oxide. The first layer has a thickness of 0.005 to 0.995 μm and the second layer has a thickness of 0.995 to 0.005 μm.

Preferably, the dielectric layer comprises a dielectric oxide of the formula:

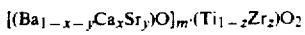

wherein $0.05 \leq x \leq 0.25$, $0 \leq y \leq 0.05$, $0.05 \leq z \leq 0.20$, and $1.000 \leq m \leq 1.020$ and may further contain $SiO_2$.

The present invention also provides a method for preparing a ceramic multilayer chip capacitor, comprising the steps of:

alternately stacking a dielectric material and an electrode-forming nickel or nickel alloy material to form a stack of dielectric layers and internal electrodes, said dielectric material containing 0.005 to 2% by weight, calculated as MnO, of a manganese compound and/or 0.005 to 5% by weight, calculated as $P_2O_5$, of a phosphorus compound based on the weight of the dielectric material, firing the stack under an oxygen partial pressure of $10^{-8}$ atm. or lower, and then heat treating the stack at a temperature of 900° to 1200° C. under an oxygen partial pressure of $10^{-8}$ atm. or higher, thereby re-oxidizing the dielectric layers to form an oxide layer having a different composition from the dielectric layers in close proximity to the internal electrodes.

According to a second aspect, the dielectric layers of the ceramic chip capacitor each consist essentially of grains and a grain boundary phase. The percent area of the grain boundary phase is up to 2% of the area of a cross section of the dielectric layer.

Preferably, the grain boundary phase is an oxide phase containing $Al_2O_3$ and $SiO_2$, more preferably at least 15% by weight of $Al_2O_3$ and at least 15% by weight of $SiO_2$ based on the weight of the grain boundary phase.

Preferably, the dielectric layer comprises a dielectric oxide of the formula:

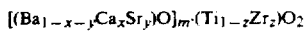

wherein $0.05 \leq x \leq 0.25$, $0 \leq y \leq 0.05$, $0.05 \leq z \leq 0.20$, and $1.000 \leq m \leq 1.020$.

Preferably, an oxide layer having a different composition from the dielectric layer is formed on the periphery of each internal electrode. The oxide layer contains at least one member selected from oxides of Mn, P and Fe. The oxide layer includes a first layer containing phosphorus oxide and a second layer containing manganese oxide.

The present invention also provides a method for preparing a ceramic multilayer chip capacitor, comprising the steps of:

alternately stacking a dielectric material and an electrode-forming nickel or nickel alloy material to form a stack of dielectric layers and internal electrodes, firing the stack under an oxygen partial pressure of $3 \times 10^{-9}$ atm. or lower, and then heat treating the stack at a temperature of 900° to 1200° C. under an oxygen partial pressure of $10^{-8}$ atm. or higher, thereby re-oxidizing the dielectric layers such that the dielectric layers consist essentially of grains and a grain boundary phase, the percent area of the grain boundary phase being up to 2% of the area of a cross section of the dielectric layer.

According to a third aspect, the capacitor is prepared by alternately stacking a dielectric material and an internal electrode-forming material of nickel or nickel alloy to form a stack or laminate, and firing the laminate. Preferably, the laminate is fired under an oxygen partial pressure of $10^{-7}$ atm. or lower, and then heat treated at a temperature of 900° to 1200° C. under an oxygen partial pressure of $10^{-8}$ atm. or higher. The dielectric material is comprised of a dielectric oxide of the formula:

wherein $0.05 \leq x \leq 0.25$, $0 \leq y \leq 0.05$, $0.05 \leq z \leq 0.20$, and $1.000 \leq m \leq 1.020$, and 0.005 to 0.5% by weight, calculated as oxide on the basis of the weight of the dielectric material, of at least one component selected from the group consisting of oxides of Y, Gd, Tb, Dy, Zr, V, Mo, Zn, Cd, Tl, Sn and P and precursors which can be converted into these oxides by firing or 0.005 to 0.5% by weight, calculated as oxide on the basis of the weight of the dielectric material, of a lithium oxide or a precursor thereof. Preferably, the dielectric material further contains at least one component selected from silicon oxide and manganese oxide. The content of silicon oxide is 0.05 to 0.25% by weight and the content of manganese oxide is 0.01 to 0.50% by weight.

Preferably, the dielectric layers consist essentially of grains and a grain boundary phase, the percent area of the grain boundary phase being up to 2% of the area of a cross section of the dielectric layer. The grain boundary phase is an oxide phase containing at least one member selected from the group consisting of $Al_2O_3$, $SiO_2$ and phosphorus oxide.

Preferably, an oxide layer having a different composition from the dielectric layer is formed on the periphery of each internal electrode. The oxide layer contains at least one member selected from oxides of Mn, P and Fe. The oxide layer includes a first layer containing phosphorus oxide and a second layer containing manganese oxide.

BENEFITS OF THE INVENTION

The ceramic multilayer chip capacitors of the present invention are manufactured by firing and heat treatment under predetermined conditions after binder removal. These firing and heat treatment steps cause an oxide layer to be formed on the periphery of the internal electrodes of Ni or Ni alloy wherein the oxide layer is composed of oxides of elements from the dielectric material and internal electrode-forming material and an oxide of a separately added material, and has a different composition from the dielectric layer. The ceramic chip capacitors having such an oxide layer on the periphery of internal electrodes are fully reliable and about 2 to 5 times longer in life than the conventional ones. The reason why the oxide layer contributes to a longer life is not fully understood, but one presumed reason is that the oxide layer restrains migration of Ni ions during firing and operation.

In the second aspect, the ceramic multilayer chip capacitor of the present invention has a dielectric layer of grains bound by a grain boundary phase. The grain boundary phase is a glass or glassy substance composed of oxides of elements from the dielectric material and internal electrode-forming material and an oxide of an incidental element introduced during manufacture. Based on the hypothesis that the grain boundary phase is related to the life of capacitors, the inventors have found that the lesser the grain boundary phase, the longer is the life. Although the correlation of the grain boundary phase to the life is not fully understood, we presume that since the grain boundary phase provides a path for various ions to migrate, the migration during operation is restrained by reducing the grain boundary phase.

The method of the present invention permits the grain boundary phase to be reduced by firing and heat treating the layered stack under predetermined conditions after binder removal. The ceramic chip capacitors having a minimized grain boundary phase in the dielectric layer are fully reliable and about 2 to 3 times longer in life than the conventional ones.

In the third aspect, the ceramic multilayer chip capacitors of the present invention use a barium titanate base dielectric material having a useful additive added thereto. These capacitors are fully reliable and about 2 to 10 times longer in life than the conventional ones.

Japanese Patent Publication No. 20851/1985 discloses a ceramic multilayer chip capacitor comprising internal electrodes of a nickel alloy and a dielectric porcelain material containing a barium titanate base: $[(Ba_xCa_ySr_z)O]_k \cdot (Ti_nZr_{1-n})O_2$, a glass component containing $Li_2O$ or $SiO_2$ and an optional component of $MnO_2$. The capacitor of this publication is also manufactured by firing and heat treating steps, but under a different oxygen partial pressure from that used during manufacture of the capacitor comprising a dielectric material containing a barium titanate base and lithium oxide or a lithium compound as a sole additive according to one embodiment of the present invention. Under the conditions disclosed in this publication, it is difficult to manufacture a long life chip capacitor. Probably for this reason, this publication gives no reference to life.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 11 is an electron micrograph under SEM of a dielectric layer of a prior art multilayer chip capacitor.

DESCRIPTION OF THE PREFERRED EMBODIMENTS

Figure 1:
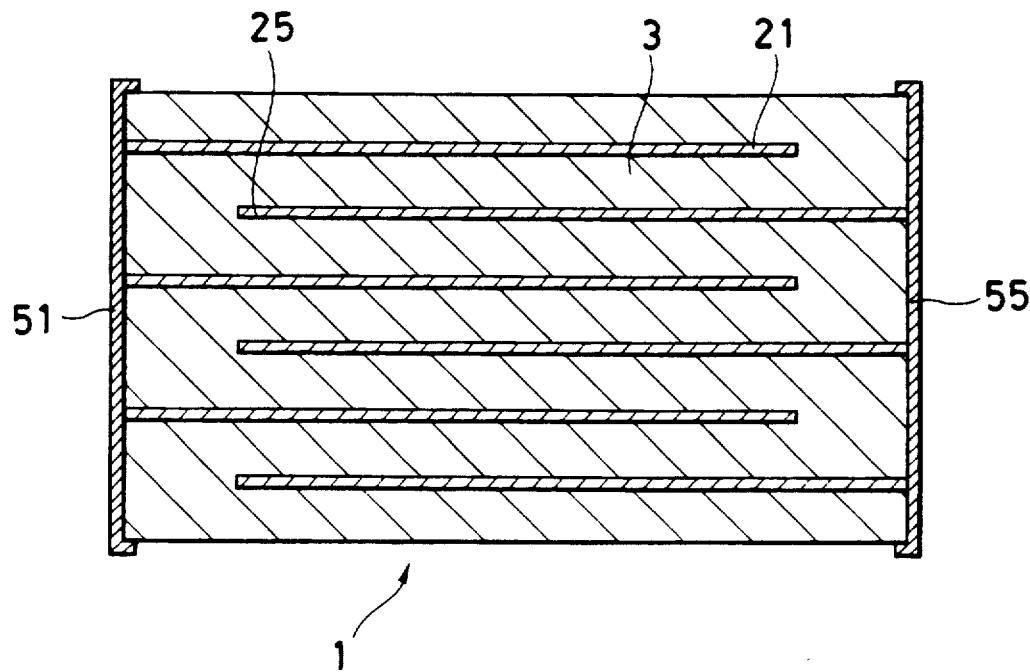
FIGS. 1 and 2 are cross-sectional views of ceramic multilayer chip capacitors according to different embodiments of the present invention.
Figure 2:
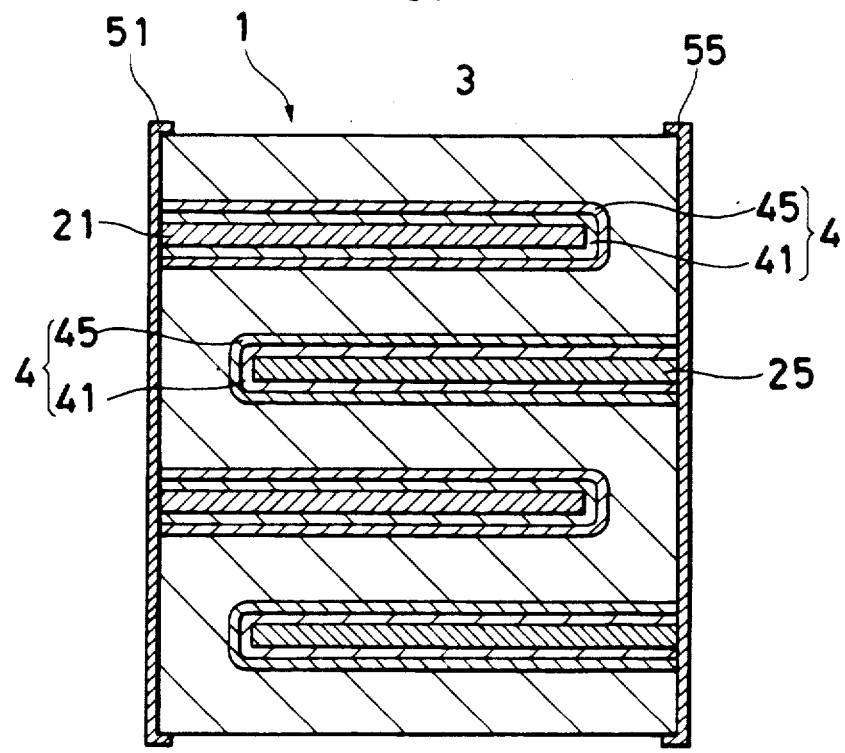

Referring to FIGS. 1 and 2, there are illustrated two preferred embodiments of the ceramic multilayer chip capacitor of the present invention. The capacitor generally designated at 1 includes a first plurality of internal electrodes 21, a second plurality of internal electrodes 25, and a plurality of dielectric layers 3 in an alternate layered structure. Every dielectric layer is contiguous to the adjoining dielectric layers at the opposite ends so that the plurality of integrated dielectric layers may be considered as a single dielectric layer. The capacitor 1 further includes a pair of external electrodes 51 and 55 connected to the first and second internal electrodes 21 and 25, respectively.

The internal electrodes 21 and 25 are formed of nickel or a nickel alloy. The nickel alloys used herein include alloys of at least 95% by weight of Ni with at least one element selected from the group consisting of Mn, Cr, Co, Al, and equivalent metals. The elemental nickel and nickel alloys may contain a trace amount, typically less than about 0.1% by weight, of P and other incidental elements.

The dimensions of the internal electrodes 21 and 25 may be determined for a particular purpose or application without undue experimentation although their thickness generally ranges from about 1 to about 5 $\mu$m, especially from about 2 to about 3 $\mu$m.

In the first aspect of the present invention, oxide layers 4 are formed on the periphery of internal electrodes 21 and 25 as shown in FIG. 2. The oxide layers 4 have a different composition from the dielectric layers 3. The dielectric layers 3 are composed of grains and a grain boundary phase.

The material of which the dielectric layers 3 are formed may be selected from various types of material, preferably titanium oxide base materials, titanate composite oxides, zirconate composite oxides and mixtures thereof. The titanium oxide base materials include $TiO_2$ and mixtures of $TiO_2$ with at least one member of NiO, CuO, $Mn_3O_4$, $Al_2O_3$, MgO, and $SiO_2$, and the titanate composite oxides include $BaTiO_3$, $SrTiO_3$, $CaTiO_3$, $MgTiO_3$ and mixtures thereof.

In the practice of the present invention, preferred among these are titanate composite oxides, especially dielectric oxides of the following formula:

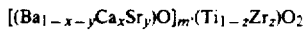

$$[(Ba_{1-x-y}Ca_xSr_y)O]_m \cdot (Ti_{1-z}Zr_z)O_2$$

wherein $0.05 \leq x \leq 0.25$, $0 \leq y \leq 0.05$, $0.05 \leq z \leq 0.20$, and $1.000 \leq m \leq 1.020$, preferably $0.06 \leq x \leq 0.10$, $0 \leq y \leq 0.01$, $0.15 \leq z \leq 0.20$, and $1.002 \leq m \leq 1.015$.

The dielectric titanate composite oxides may further contain silicon oxide and/or manganese oxide. Preferably silicon oxide is contained in an amount of about 0.05% to about 0.25% by weight in the form of $SiO_2$ and manganese oxide is contained in an amount of about 0.01% to about 0.50% by weight in the form of MnO. Inclusion of oxides of Al, Ni, Mg, Co and Hf in amounts of less than about 0.5% by weight is also contemplated.

In the third aspect of the present invention, the dielectric material based on a titanate composite oxide of the above-defined formula contains at least one component selected from the group consisting of oxides of Y, Gd, Tb, Dy, Zr, V, Mo, Zn, Cd, Tl, Sn and P and compounds which can be converted into these oxides by firing (simply referred to as precursors, hereinafter), in an amount of 0.005 to 0.5%, preferably 0.01 to 0.25%, more preferably 0.05 to 0.20% by weight on the basis of the weight of the dielectric material, calculated as oxide, that is, most stable oxide $Y_2O_3$, $Gd_2O_3$, $Tb_2O_3$, $Dy_2O_3$, $ZrO_2$, $V_2O_5$, $MoO_3$, ZnO, CdO, $Tl_2O_3$, $SnO_2$ and $P_2O$. In addition to the foregoing oxides, lithium oxide or a precursor thereof may also be contained, preferably in such an amount that the total amount may fall in the above-defined range calculated as $Li_2O$. It is also contemplated to add lithium oxide or a precursor thereof instead of the foregoing oxides. In such a case, lithium oxide is contained in an amount of 0.005 to 0.5%, preferably 0.01 to 0.25%, more preferably 0.05 to 0.20% by weight calculated as $Li_2O$.

It will be understood that P is often present in the dielectric materials in the form of a phosphate salt while the remaining elements are present in their most stable oxide form as defined above, and that P is mainly contained in the grain boundary phase while the remaining elements are mainly contained in the grains.

The benefits of the present invention are not available by adding oxides other than the oxides of the above-mentioned elements or by adding any of these oxides in amounts outside the above-defined ranges.

The number, dimensions and other parameters of the dielectric layers 3 may be determined for a particular purpose and application. Often, the number of layers ranges from 1 to about 100, preferably from 5 to about 50. The layer thickness ranges from about 5 to about 50 $\mu$m, preferably from about 10 to about 20 $\mu$m.

As previously described, the dielectric layer 3 is composed of grains and a grain boundary phase from a crystallographic aspect. The grains preferably have a mean particle size of about 1 to about 5 $\mu$m.

The area proportion of the grain boundary phase in the dielectric layer is up to 2%, preferably 0.5 to 1.5%, more preferably 0.5 to 1.0% of the area of an arbitrary cross section of the dielectric layer. If the percent area of the grain boundary phase exceeds the limit, the benefits of the invention are lost. With an extremely low percent area of the grain boundary phase, it is difficult to form a dielectric layer or the dielectric layer cannot be fully densified. The percent area of the grain boundary phase may be determined by taking a photograph of the dielectric layer under a scanning electron microscope (SEM).

The grain boundary phase is a glass or glassy substance composed of oxides of elements from the dielectric material and internal electrode-forming material and oxides of incidental elements introduced during manufacture. Preferably, the grain boundary phase is an oxide phase containing more than about 15%, more preferably about 25 to 50% by weight of $SiO_2$, and more than about 15%, more preferably about 20 to 50% by weight of $Al_2O_3$ based on the weight of the grain boundary phase. The preferred oxide phase contains 0.05 to 1.0%, more preferably 0.1 to 0.6% by weight, calculated as phosphorus oxide, of P in addition to silicon and aluminum oxides. A longer capacitor life is expectable. The grain boundary phase may further contain less than 55% by weight of Ca, Fe, Mn, Zr, Ti, Ba, Ni and Sr in any desired oxide form.

Among the components of the grain boundary phase, $SiO_2$, Ba, Ca, Sr, Ti, Zr and Mn are derived from the components of the dielectric material, $Al_2O_3$ is incidentally introduced during manufacture, and Fe and P are derived from impurities in the internal electrode-forming material and dielectric material.

From a compositional aspect, the oxide layers 4 are formed at the interface between the dielectric layers 3 and the internal electrodes 21 and 25 as shown in FIG. 2, the oxide layers 4 having a different composition from the surrounding dielectric layers 3.

The oxide layer 4 consists essentially of at least one oxide. Good results are obtained when the oxide layer contains at least one member selected from oxides of Mn, P, and Fe. Good results are also obtained when the oxide layer is of titanate composite oxides, especially of the above-defined formula.

The manganese oxide is preferably contained in an amount of 1 to 99%, more preferably 10 to 60%, most preferably 30 to 45% by weight of the oxide layer, calculated as MnO. Where the oxide layer contains manganese oxide, Al, Si, Ca, Ni, Fe, Ba, Ti, Zr and P are co-present usually in the form of oxides. Among these elements in the oxide layer, Mn, Si, Ba, Ca, Ti, Zr and P are derived from the dielectric material, Ni is derived from the internal electrode forming material, and Fe, P and Al are derived from incidental impurities in the internal electrode-forming material and the dielectric material.

The phosphorus oxide is preferably contained in an amount of 0.1 to 99%, more preferably 3 to 30%, most preferably 15 to 25% by weight of the oxide layer, calculated as $P_2O_5$. Where the oxide layer contains phosphorus oxide, Ti, Ba, Fe, Al, Si, Ca, Zr and Mn are co-present usually in the form of oxides. Among these elements in the oxide layer, phosphorus oxide is derived from an incidental impurity in the dielectric material or a P compound added thereto in phosphate salt form, Ti, Ba, Ca, Zr, Si and Mn are derived from the dielectric material, and Fe and Al are derived from incidental impurities in the internal electrode-forming material and the dielectric material. Where manganese and phosphorus oxides precipitate in the oxide layer, the layer acts as a barrier layer for preventing migration of Ni ions during operation.

The iron oxide is preferably contained in an amount of 0.1 to 99%, more preferably 0.5 to 30%, most preferably 5 to 20% by weight of the oxide layer, calculated as $Fe_2O_3$. Where the oxide layer contains iron oxide, Al, Si, Ca, Ti, Ni, Ba, Zr, Mn and P are co-present usually in the form of oxides. Among these elements in the oxide layer, iron oxide is derived from incidental impurities in the internal electrode-forming material and dielectric material, Si, Ca, Ti, Ba, Zr and Mn are derived from the dielectric material, Ni is derived from the internal electrode-forming material, and P and Al are derived from incidental impurities in the internal electrode-forming material and the dielectric material.

In turn, the grains which constitute the great majority of the dielectric layer 3 contain iron (Fe) components derived from either the dielectric stock material or incidental impurities and these Fe components are detrimental to the life of capacitors. Therefore, unlike manganese and phosphorus oxides, it contributes to capacitor life extension to collect as much iron oxides in the oxide layer to deplete the grains of iron components.

Preferably, the oxide layer has a thickness of about 0.01 to about 1 μm, more preferably about 0.05 to about 0.2 μm. Thicker oxide layers beyond the upper limit would cause a lowering of electricity storage ability. Not only a capacitance lowering occurs, but breakdown voltage, life and reliability are adversely affected.

The oxide layer 4 may be of a single layer structure although an oxide layer of two-layer structure as shown in FIG. 2 offers additional benefits. The oxide layer 4 shown in FIG. 2 consists of an underlying oxide layer 41 and an overlying oxide layer 45 coextensive with the associated internal electrode.

In the case of two-layer structure, one layer is rich in P oxide and the other layer is rich in Mn oxide. Inclusion of Fe oxide is more effective. More particularly, the underlying oxide layer 41 contains P oxide and the overlying oxide layer 45 contains Mn oxide. The underlying oxide layer 41 is a primary layer which can promote formation of the overlying oxide layer 45 so that the two-layer structure as a whole is more easily formed than the single layer structure. In particular, the underlying oxide layer 41 facilitates formation of the overlying Mn oxide-rich oxide layer 45. Iron oxide is often concentrated in the overlying oxide layer 45, but may also be contained in the underlying oxide layer 41.

The overlying oxide layer 45 preferably contains about 1 to 99%, more preferably 10 to 50%, most preferably 25 to 40% by weight of manganese oxide, calculated as MnO on the basis of the weight of the overlying layer. Also preferably, the overlying oxide layer 45 contains about 0.1 to 99%, more preferably about 0.1 to 25%, most preferably about 5 to 15% by weight of iron oxide, calculated as $Fe_2O_3$. In addition, Ti, Ni, Ca, Ba, Zr, Al, Si and P may be contained in oxide form.

The content of phosphorus oxide in the underlying oxide layer 41 preferably ranges from about 0.1 to 99%, more preferably about 3 to 30%, most preferably about 15 to 25% by weight, calculated as $P_2O_5$. In addition, Ba, Ca, Ti, Zr, Al, Si, Mn and Ni may be contained in oxide form.

As to the thickness, both the underlying and overlying layers 41 and 45 range from about 0.005 to 0.995 μm, more preferably from about 0.05 to 0.2 μm, with the total thickness falling in the above-defined range.

The oxide layer 4 may have a three or multiple layered structure, if desired.

The oxide layer 4 may further contain at least one member of Li, V, Ni, Zn, Y, Zr, Mo, Cd, Sn, Gd, Tb, Dy and Tl in oxide form which are added to the dielectric material as will be described later.

The external electrodes 51 and 55 are generally formed of Cu or Cu alloys as well as Ni or Ni alloys. Also employable are Ag and Ag-Pd alloys. The external electrodes 51 and 55 may have any desired thickness which is determined for a particular purpose and application. Their thickness generally ranges from about 10 to about 50 μm.

The multilayer chip capacitor 1 may have any desired configuration and dimensions which are determined for a particular purpose and application. In the case of rectangular configuration, for example, the capacitors are often dimensioned to 1.6–3.2 mm by 0.8–1.6 mm by 0.6–1.2 mm.

Now, the method for manufacturing the ceramic multilayer chip capacitor of the invention is described.

First, pastes for the dielectric layers 3, internal electrodes 21 and 25, and external electrodes 51 and 55 are separately prepared. The paste for the dielectric layers 3 is prepared by mixing powder stock materials, for example, oxides of Ti, Ba, Sr, Ca and Zr in proportion to the desired composition of dielectric material. Additionally, silicon oxide and/or manganese oxide may be used. Instead of oxides, precursors which can be converted into oxides by firing, for example, carbonates, sulfates, nitrates, oxalates, and organometallic compounds may be used. Use of mixtures of oxides and precursors is also contemplated. The powder stock materials usually have a mean particle size of about 0.1 to about 5 μm. The power mix may further contain about 0.05 to 0.25% by weight of $SiO_2$ as sintering aids or mineralizer.

Preferably, the powder mix contains a manganese compound or a phosphorus compound, more preferably both of them. The content of the Mn compound preferably ranges from about 0.005 to 2%, especially 0.05 to 0.5% by weight of MnO. Any desired manganese compounds may be used, including manganese oxides such as MnO, manganese carbonate, oxalate, hydroxide, nitrate, and sulfate, and organometallic compounds of manganese and mixtures thereof. The content of the P compound preferably ranges from about 0.005 to 5%, especially 0.01 to 0.05% by weight of $P_2O_5$. Any desired phosphorus compounds may be used, including phosphorus oxides such as $P_2O_5$, organic phosphorus compounds and mixtures thereof.

A dielectric material is obtained from such a powder mix by the following procedure. First, powder feed materials are blended in the desired proportion and wet milled in a ball mill or the like. The mix is dried by a spray drier, and then calcined, typically at 800° to 1300° C. for about 2 to 10 hours in air. The calcined mix is then pulverized to a predetermined particle size in a jet mill or ball mill. The Mn and P compounds may be added either before or after calcination.

In one preferred embodiment, the mix resulting from calcination is a dielectric oxide of the formula:

$$[(Ba_{1-x-y}Ca_xSr_y)O]_m \cdot (Ti_{1-z}Zr_z)O_2$$

wherein $0.05 \leq x \leq 0.25$, $0 \leq y \leq 0.05$, $0.05 \leq z \leq 0.20$, and $1.000 \leq m \leq 1.020$, preferably $0.06 \leq x \leq 0.10$, $0 \leq y \leq 0.01$, $0.15 \leq z \leq 0.20$, and $1.002 \leq m \leq 1.015$ alone or a mixture of silicon oxide, manganese oxide, and a dielectric oxide of the formula. In the latter case, the content of silicon oxide ranges from about 0.05 to 0.25%, especially from about 0.10 to 0.20% by weight and the content of manganese oxide ranges from about 0.005 to 2%, especially from about 0.005 to 0.5% by weight. At this point, the silicon and manganese oxides are preferably in the form of $SiO_2$ and MnO, respectively. They may be added either before or after calcination. Thereafter, to the dielectric oxide of the formula alone or the mix is added at least one component selected from the group consisting of oxides of Y, Gd, Tb, Dy, Zr, V, Mo, Zn, Cd, Tl, Sn and P and precursors thereof. In addition, lithium oxide or a precursor may be added. It is also possible to add lithium oxide or a precursor thereof solely instead of the foregoing oxides or precursors thereof.

The precursors which can be converted into oxides by firing include carbonates, sulfates, oxalates, nitrates, organometallic compounds and mixtures thereof. The amount of the foregoing oxides or precursors added preferably ranges from 0.005 to 0.5%, more preferably 0.01 to 0.25%, most preferably 0.05 to 0.20% by weight, calculated as their most stable oxide $Li_2O$, $Y_2O_3$, $Gd_2O_3$, $Tb_2O_3$, $Dy_2O_3$, $ZrO_2$, $V_2O_5$, $MoO_3$, ZnO, CdO, $Tl_2O_3$, $SnO_2$ and $P_2O_5$. Outside this range, the benefits of life and reliability can be lost and the capacitance would lower.

The calcined mix is then pulverized to a predetermined particle size in a jet mill or ball mill.

The paste is prepared by mixing the powdered dielectric material with additives such as a binder, plasticizer, dispersant and solvent. Glass frit may also be added. The binders used herein include ethyl cellulose, abietinic acid, and polyvinyl butyral. The plasticizers used herein include abietinic acid derivatives, diethyl oxalate, polyalkylene glycols such as polyethylene glycol, and phthalate esters such as dibutyl phthalate. The dispersants used herein include glycerine, octadecylamine, trichloroacetic acid, oleic acid, octadiene, ethyl oleate, glycerine monooleate, glycerine trioleate, glycerine tristearate, and menhaden oil. The solvents used herein include toluene, terpineol, butylcarbitol, and methyl ethyl ketone. The paste is prepared by blending about 50 to 80% of the powdered dielectric material with about 2 to 5% of a binder, about 0.1 to 5% of a plasticizer, about 0.1 to 5% of a dispersant and about 20 to 50% of a solvent, based on the total weight of the paste. The powdered dielectric material mix is kneaded with these additives in a three roll mill or the like to form a paste or slurry.

The paste for the internal electrodes 21 and 25 is prepared by blending a conductive material, typically nickel or a nickel alloy or a mixture thereof with an organic vehicle. The conductive material is in finely divided form, may have any desired shape including spherical granules and flakes and mixtures thereof. Typically it has a mean particle size of 0.1 to 10 μm, preferably 0.1 to 1 μm. The organic vehicle typically contains a binder and a solvent. The binder may be any of well known binders including ethyl cellulose, acrylic resin and butyral resin, and used in an amount of about 1 to 5% by weight of the paste. The solvent may be any of well known solvents including terpineol, butylcarbitol and kerosene, and used in an amount of about 20 to 55% by weight of the paste. In addition, there may be added a dispersant such as sorbitan fatty acid esters and glycerine fatty acid esters, a plasticizer such as dioctyl phthalate, dibutyl phthalate, and butyl phthalylglycolate, and other various dielectric or insulating ceramic powders commonly used for the purposes of preventing delamination and excess sintering. It is also useful to add organo metallic resinates.

The paste for the external electrodes 51 and 55 may be a conventional paste which is prepared by blending a conductive material with an organic vehicle. The conductive material may be Cu, Ni, Ag, an alloy thereof or any other suitable metal or alloy.

The paste for the internal electrodes 21 and 25 and the paste for the dielectric layers 3 are alternately applied in layer form to produce a stack by well-known printing, transfer, green sheet and other methods. The stack is cut to a desired size, removed of the binder, fired, and finally heat treated for re-oxidation of the dielectric layers 3.

Binder removal may be carried out under ordinary conditions, preferably under the following conditions:
heating rate: 10°-300° C./hour, especially 50°-100° C./hour,
holding temperature: 600°-1200° C., especially 700°-900° C.,
holding time: ½-5 hours, especially 1-3 hours,
oxygen partial pressure: $10^{-4}-10^{-6}$ atm., especially $10^{-5}-10^{-6}$ atm.

The atmosphere is preferably humid nitrogen gas.

Firing is preferably carried out under the following conditions:
heating rate: 50°-500° C./hour, especially 200°-300° C./hour,
holding temperature: 1250°-1400° C., especially 1300°-1380° C.,
holding time: ½-8 hours, especially 1-3 hours,
cooling rate: 50°-500° C./hour, especially 200°-300° C./hour, The atmosphere is preferably a humid mixture of nitrogen and hydrogen gases. Firing should preferably be carried out under an oxygen partial pressure of $10^{-7}$ atm. or lower, preferably $10^{-8}$ to $10^{-12}$ atm., especially $3 \times 10^{-9}$ to $10^{-12}$ atm. Firing under a higher oxygen partial pressure would cause the internal electrodes to be oxidized whereas firing under an extremely lower oxygen partial pressure would cause abnormal sintering of the electrodes which can be locally broken.

The final heat treatment is carried out at a holding or maximum temperature of 900° to 1200° C., preferably 900° to 1100° C., more preferably 1000° to 1100° C. Outside the range, lower temperatures result in short oxidation of the dielectric material, resulting in capacitors with a shorter life, whereas higher temperatures would cause oxidation of the internal electrodes or undesired reaction thereof with the adjoining dielectric material, resulting in a lowering of capacitance and a shorter capacitor life.

The oxygen partial pressure during heat treatment is $10^{-8}$ atm. or higher, especially $10^{-4}$–$10^{-7}$ atm. The dielectric and oxide layers 3 and 4 undergo insufficient re oxidation under a lower oxygen partial pressure, whereas the internal electrodes can be oxidized under a higher oxygen partial pressure.

The remaining heat treating conditions include a holding time of 0 to 6 hours, especially 2 to 5 hours and a cooling rate of 50° to 500° C./hour, especially 100° to 300° C./hour. The atmosphere is preferably humid nitrogen gas.

Humid nitrogen gas or a humid mixture of nitrogen and hydrogen gases may be obtained by means of a humidifier, for example, by bubbling the gas into water, typically at about 5° to 75° C.

The steps of binder removal, firing, and heat treatment may be carried out continuously or separately. In the latter case, a modification is made in the firing step such that the laminate is heated in a nitrogen atmosphere until the holding temperature for binder removal is reached and that after the laminate has been cooled down to the holding or maximum temperature for heat treatment, it is cooled in a nitrogen atmosphere. A modification is also made in the heat treatment step such that heating is carried out in a nitrogen atmosphere until the holding or maximum temperature is reached.

A sintered laminate is obtained in this way. The sintered laminate on the surfaces is polished by tumbling or sand blasting. Then the external electrode paste is baked to the opposed surfaces to form the external electrodes 51 and 55. If desired, pads are formed on the external electrodes 51 and 55 by plating or the like.

EXAMPLE

Examples of the present invention is given below by way of illustration and not by way of limitation. All parts and percents are by weight unless otherwise stated.

EXAMPLE 1

A dielectric layer-forming paste was prepared. There were provided the following powder stock materials.

| Ingredients | % by weight |
|---|---|
| $BaCO_3$ | 65.28 |
| $TiO_2$ | 23.72 |
| $ZrO_2$ | 7.49 |
| $CaCO_3$ | 2.88 |
| $SiO_2$ | 0.18 |
| $MnCO_3$ | 0.20 |

The powder stock materials were wet milled for 16 hours in an alumina ball mill. The mix was dried through a spray drier, calcined in air at a temperature of 1200° C. for 3 hours, and then wet pulverized for 16 hours in a ball mill, obtaining a barium titanate base dielectric material powder having a mean particle size of 1.3 μm. This dielectric material had the following composition.

[$(Ba_{0.92}Ca_{0.08})O$]$_{1.004}\cdot(Ti_{0.83}Zr_{0.17})O_2$: 99.62%
$SiO_2$: 0.18%
$MnO$: 0.20%

A dielectric layer-forming paste was prepared by kneading the dielectric material powder with the following additives into a slurry by a three roll mill.

| Ingredients | Parts by weight |
|---|---|
| Dielectric material powder | 100 |
| Terpineol | 28 |
| Toluene | 14 |
| Dispersant | 0.2 |
| Lacquer | 36.5 |

Separately, an internal electrode-forming paste was prepared by kneading the following ingredients into a slurry by a three roll mill.

| Ingredients | Parts by weight |
|---|---|
| Ni | 100 |
| Terpineol | 93 |
| Dispersant | 1 |
| Lacquer | 6 |

A ceramic multilayer chip capacitor of a structure as shown in FIG. 2 was fabricated using these pastes. First, the dielectric layer and internal electrode-forming pastes were alternately applied in layer form by a printing method. The resulting stack included 4 dielectric layers. After cutting to a predetermined size, the stack was continuously subjected to binder removal, firing, and heat treatment under the following conditions.

Binder removal
  Heating rate: 50° C./hour
  Holding temperature: 800° C.
  Holding time: 2 hours
  Atmosphere: humid $N_2$ gas
  Oxygen partial pressure: $10^{-6}$ atm.
Firing
  Heating rate: 200° C./hour
  Holding temperature: 1320° C.
  Holding time: 4 hours
  Cooling rate: 300° C./hour
  Atmosphere: humid $N_2$ and $H_2$ gas mixture
  Oxygen partial pressure: $10^{-5}$ atm.
Heat treatment
  Holding temperature: 1100° C.
  Holding time: 2 hours
  Cooling rate: 300° C./hour
  Atmosphere: humid $N_2$ gas
  Oxygen partial pressure: $10^{-5}$ atm.

The atmosphere gas was moistened by means of a humidifier filled with water at 10°–35° C.

The sintered stack on the side surfaces was polished by sand blasting. In-Ga alloy was applied to opposed side surfaces to form external electrodes.

There was completed a ceramic multilayer chip capacitor having dimensions of 3.2 mm × 1.6 mm × 1.0 mm. The dielectric layers each were 13 μm thick and the internal electrodes each were 2.5 μm thick. The grains in the dielectric layers had a mean particle size of 3.1 μm.

An observation under a scanning electron microscope (SEM) revealed the presence of an oxide layer on the periphery of the internal electrodes. The oxide layer was a single layer of 0.11 μm thick. The composition of the oxide layer was analyzed using a scanning transmission electron microscope (STEM), with the following results. (Chemical formulae are basis for calculation.)

Mn oxide: 38.0% of MnO
Al oxide: 0.1% of $Al_2O_3$
Si oxide: 1.4% of $SiO_2$
Ca oxide: 0.7% of CaO
Ni oxide: 9.5% of NiO
Zr oxide: 0.1% of $ZrO_2$
Ti oxide: 33.9% of $TiO_2$
Fe oxide: 10.5% of $Fe_2O_3$
P oxide: 1.4% of $P_2O_5$
Ba oxide: 4.4% of BaO The capacitor was subjected to an accelerated life test by applying a DC voltage of 200 volts at a temperature of 200° C. The effective life was 1.3 hours.

EXAMPLE 2

A multilayer chip capacitor was fabricated by the same procedure as in Example 1 except for the firing and heat treating conditions.

Firing
  Heating rate: 200° C./hour
  Holding temperature: 1380° C.
  Holding time: 2 hours
  Cooling rate: 300° C./hour
  Atmosphere: humid $N_2$ and $H_2$ gas mixture
  Oxygen partial pressure: $10^{-9}$ atm.
Heat treatment
  Holding temperature: 1000° C.
  Holding time: 2 hours
  Cooling rate: 300° C./hour
  Atmosphere: humid $N_2$ gas
  Oxygen partial pressure: $10^{-5}$ atm.

In the completed capacitor, the dielectric layers each were 13 μm thick and composed mainly of grains having a mean particle size of 3.5 μm and the internal electrodes each were 2.3 μm thick.

An observation under SEM revealed the presence of a single oxide layer of 0.12 μm thick on the periphery of the internal electrodes. On STEM analysis, the oxide layer had the following composition.

Fe oxide: 16.3% of $Fe_2O_3$
Al oxide: 0.2% of $Al_2O_3$
Si oxide: 0.3% of $SiO_2$
Ti oxide: 4.5% of $TiO_2$
Mn oxide: 13.0% of MnO
Ni oxide: 8.5% of NiO
P oxide: 14.5% of $P_2O_5$
Zr oxide: 2.3% of $ZrO_2$
Ba oxide: 40.2% of BaO In the accelerated life test, the capacitor had an effective life of 2.3 hours.

EXAMPLE 3

A multilayer chip capacitor was fabricated by the same procedure as in Example 1 except for the firing and heat treating conditions.

Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-9}$ atm.
Heat treatment
  Holding temperature: 1000° C.
  Holding time: 2 hours
  Cooling rate: 300° C./hour
  Atmosphere: humid $N_2$ gas
  Oxygen partial pressure: $10^{-5}$ atm.

In the completed capacitor, the dielectric layers each were 13 μm thick and composed mainly of grains having a mean article size of 3 μm and the internal electrodes each were 2.4 μm thick.

An observation under SEM revealed the presence of a single oxide layer of 0.09 μm thick on the periphery of the internal electrodes. On STEM analysis, the oxide layer had the following composition.

P oxide: 18.9% of $P_2O_5$
Al oxide: 0.3% of $Al_2O_3$
Si oxide: 0.1% of $SiO_2$
Mn oxide: 0.9% of MnO
Ni oxide: 0.2% of NiO
Ca oxide: 0.4% of CaO
Zr oxide: 0.1% of $ZrO_2$
Fe oxide: 0.2% of $Fe_2O_3$
Ti oxide: 2.2% of $TiO_2$
Ba oxide: 76.7% of BaO In the accelerated life test, the capacitor had an effective life of 1.1 hours.

EXAMPLE 4

A multilayer chip capacitor was fabricated by the same procedure as in Example 1 except for the firing and heat treating conditions.

Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-11}$ atm.
Heat treatment
  Holding temperature: 1100° C.
  Holding time: 2 hours
  Cooling rate: 300° C./hour
  Atmosphere: humid $N_2$ gas
  Oxygen partial pressure: $10^{-5}$ atm.

In the completed capacitor, the dielectric layers each were 13 μm thick and composed mainly of grains having a mean particle size of 3.0 μm and the internal electrodes each were 2.4 μm thick.

Figure 3:
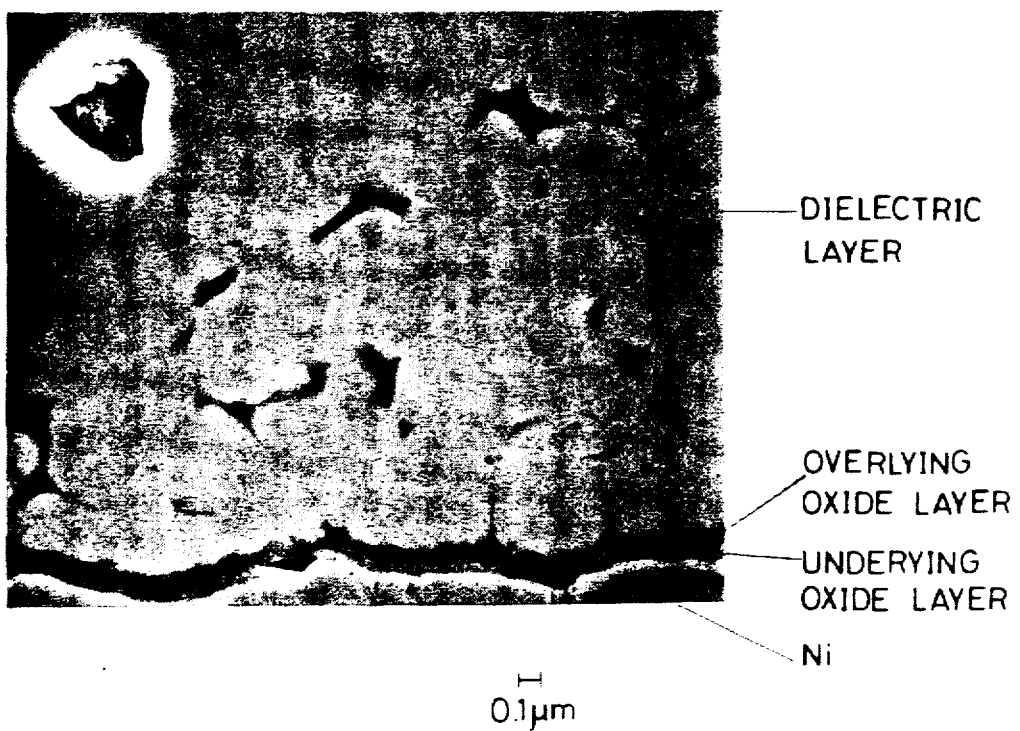
FIG. 3 is an electron micrograph under SEM of a dielectric material portion showing the presence of upper and lower oxide layers.

An observation under SEM revealed the presence of double oxide layers 41 and 45 on the surfaces of the internal electrodes as shown in FIG. 2. The underlying and overlying oxide layers were 0.07 μm and 0.08 μm thick, respectively. FIG. 3 is a photomicrograph of an electrode adjacent portion of the dielectric layer, showing the presence of double oxide layers. In this photo, a lower portion is a nickel electrode, an upper portion occupying the majority of the photo is a dielectric layer, and a narrow curved band therebetween corresponds to oxide layers. The interface between the oxide layers is recognizable.

On STEM analysis, the oxide layers had the following composition.

| Underlying oxide layer 41 | |
|---|---|
| Ba oxide | 71.2% of BaO |
| P oxide | 21.0% of $P_2O_5$ |
| Ti oxide | 2.8% of $TiO_2$ |
| Fe oxide | 1.9% of $Fe_2O_3$ |
| Ni oxide | 1.9% of NiO |
| Mn oxide | 0.7% of MnO |
| Si oxide | 0.2% of $SiO_2$ |
| Ca oxide | 0.1% of CaO |
| Zr oxide | 0.1% of $ZrO_2$ |
| Al oxide | 0.1% of $Al_2O_3$ |
| Overlying oxide layer 45 | |
| Ti oxide | 37.5% of $TiO_2$ |
| Mn oxide | 33.0% of MnO |
| Fe oxide | 8.0% of $Fe_2O_3$ |
| Ni oxide | 8.0% of NiO |
| Ba oxide | 5.6% of BaO |
| Zr oxide | 5.0% of $ZrO_2$ |
| P oxide | 1.8% of $P_2O_5$ |
| Si oxide | 0.8% of $SiO_2$ |
| Al oxide | 0.2% of $Al_2O_3$ |
| Ca oxide | 0.1% of CaO |

The contents of P and Mn oxides in the underlying and overlying oxide layers were also examined by taking photographs under an electron radiation microanalyzer with a magnifying power of X2800.

Figure 4:
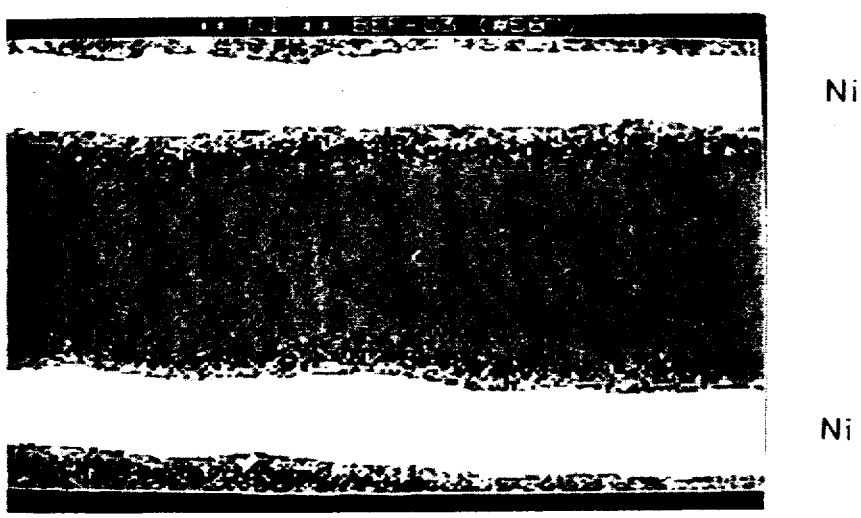
FIGS. 4 and 5 are micrographs under an electron microanalyzer of an electrode adjacent portion of a multilayer chip capacitor showing the Ni concentration distribution.

FIG. 4 is a microanalysis photo of focusing on Ni, in which nickel internal electrodes look as two white bands.

Figure 6:
FIGS. 6 and 7 are micrographs under an electron microanalyzer of an electrode adjacent portion of a multilayer chip capacitor showing the Mn concentration distribution.

FIG. 6 is a microanalysis photo focusing on Mn in which Mn rich areas look as four white strips.

Figure 8:
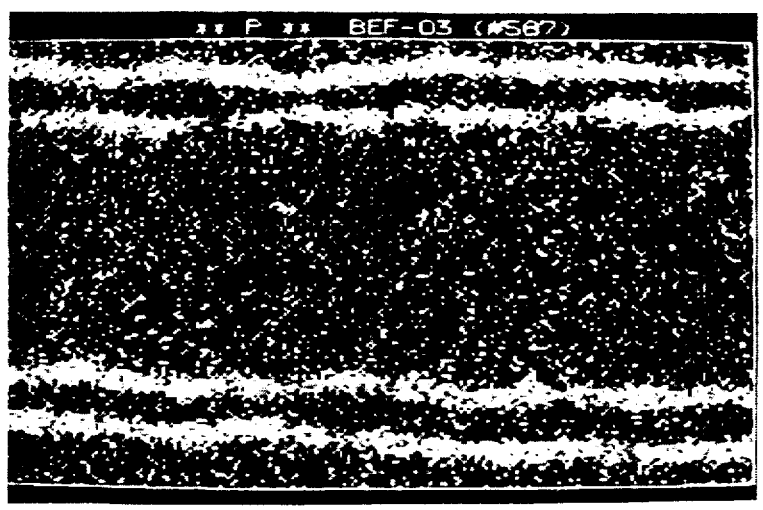
FIGS. 8 and 9 are micrographs under an electron microanalyzer of an electrode adjacent portion of a multilayer chip capacitor showing the P concentration distribution.

FIG. 8 is a microanalysis photo focusing on P in which P rich areas look as four white strips.

In the accelerated life test, the capacitor had an effective life of 2.6 hours.

COMPARATIVE EXAMPLE 1

A multilayer chip capacitor was fabricated by the same procedure as in Example 1 except for the firing and heat treating conditions.
Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-7}$ atm.
Heat treatment
  Holding temperature: 1000° C.
  Holding time: 2 hours
  Cooling rate: 300° C./hour
  Atmosphere: humid $N_2$ gas
  Oxygen partial pressure: $10^{-5}$ atm.

In the completed capacitor, the dielectric layers each were 13 μm thick and contained grains having a mean particle size of 3.8 μm and the internal electrodes each were 2.5 μm thick. An observation under SEM revealed the absence of an oxide layer on the internal electrodes. In the accelerated life test, the capacitor had an effective life of 0.18 hours.

The benefits of the invention are evident from the data of Examples 1-4 in comparison with these data of the comparative sample.

EXAMPLE 5

A dielectric layer-forming paste was prepared. There were provided the following powder stock materials.

| Ingredients | % by weight |
|---|---|
| $BaCO_3$ | 65.28 |
| $TiO_2$ | 23.72 |
| $ZrO_2$ | 7.49 |
| $CaCO_3$ | 2.88 |
| $SiO_2$ | 0.18 |
| $MnCO_3$ | 0.20 |

The powder stock materials were wet milled for 16 hours in an alumina ball mill. The mix was dried through a spray drier, calcined in air at a temperature of 1200° C. for 5 hours, and then wet pulverized for 16 hours in a ball mill, obtaining a barium titanate base dielectric material powder a mean particle size of 1.4 μm. This dielectric material had the following composition.

$[(Ba_{0.92}Ca_{0.08})O]_{1.004} \cdot (Ti_{0.83}Zr_{0.17})O_2$: 99.62%
$SiO_2$: 0.18%
MnO: 0.20%

The dielectric material powder was kneaded with the following additives into a slurry by a three roll mill to prepare a dielectric layer-forming paste.

| Ingredients | Parts by weight |
|---|---|
| Dielectric material powder | 100 |
| Terpineol | 28 |
| Toluene | 14 |
| Dispersant | 0.2 |
| Lacquer | 36.5 |

Separately, an internal electrode-forming paste was prepared by kneading the following ingredients into a slurry by a three roll mill.

| Ingredients | Parts by weight |
|---|---|
| Ni | 100 |
| Terpineol | 93 |
| Dispersant | 1 |
| Lacquer | 6 |

A ceramic multilayer chip capacitor of a structure as shown in FIG. 1 was fabricated using these pastes. First, the dielectric layer and internal electrode-forming pastes were alternately applied in layer form by a printing method. The resulting stack included 15 dielectric layers. After cutting to a predetermined size, the stack was continuously subjected to binder removal, firing, and heat treatment under the following conditions.
Binder removal
  Heating rate: 50° C./hour
  Holding temperature: 800° C.
  Holding time: 2 hours
  Atmosphere: humid $N_2$ gas
  Oxygen partial pressure: $10^{-6}$ atm.
Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-5}$ atm.

Heat treatment
 Holding temperature: 1100° C.
 Holding time: 2 hours
 Cooling rate: 300° C./hour
 Atmosphere: humid $N_2$ gas
 Oxygen partial pressure: $10^{-5}$ atm.

The atmosphere gas was moistened by means of a humidifier filled with water at 10°-35° C.

The sintered stack on the side surfaces was polished by sand blasting. In-Ga alloy was applied to opposed side surfaces to form external electrodes.

There was completed a ceramic multilayer chip capacitor having dimensions of 3.2 mm×1.6 mm×1.2 mm. The dielectric layers each were 20 μm thick and the internal electrodes each were 2.5 μm thick. The grains in the dielectric layers had a mean particle size of 3.0 μm.

Figure 10:
FIG. 10 is an electron micrograph under SEM of a dielectric layer of a multilayer chip capacitor of the present invention.

FIG. 10 is a photomicrograph on a cross section of the dielectric layer under a scanning electron microscope (SEM). Using the photo, the areas of grain and grain boundary phases were determined. The percent area of the grain boundary phase was 0.7%. As seen from FIG. 10, no oxide layer was present on the internal electrodes and the grain boundary phase is minimized.

The composition of the grain boundary phase was analyzed using a scanning transmission electron microscope (STEM), with the following results. (Chemical formulae are basis for calculation.)
 Si oxide: 31.8% of $SiO_2$
 Al oxide: 26.7% of $Al_2O_3$
 Mn oxide: 0.2% of MnO
 Fe oxide: 1.0% of $Fe_2O_3$
 Ni oxide: 1.0% of NiO
 P oxide: 0.1% of $P_2O_5$
 Ba oxide: 27.7% of BaO
 Ti oxide: 11.4% of $TiO_2$
 Zr oxide: 0.1% of $ZrO_2$ The capacitor was subjected to an accelerated life test by applying a DC voltage of 200 volts at a temperature of 200° C. The effective life was 8.3 hours.

EXAMPLE 6

A multilayer chip capacitor was fabricated by the same procedure as in Example 5 except for the firing and heat treating conditions.
Firing
 Heating rate: 200° C./hour
 Holding temperature: 1360° C.
 Holding time: 2 hours
 Cooling rate: 300° C./hour
 Atmosphere: humid $N_2$ and $H_2$ gas mixture
 Oxygen partial pressure: $10^{-10}$ atm.
Heat treatment
 Holding temperature: 1100° C.
 Holding time: 2 hours
 Cooling rate: 300° C./hour
 Atmosphere: $N_2$ gas
 Oxygen partial pressure: $10^{-5}$ atm.

In the completed capacitor, the dielectric layers each were 20 μm thick and consisted essentially of grains having a mean particle size of 3.2 μm with the percent area of the grain boundary phase being 0.6%. The internal electrodes each were 2.5 μm thick.

On STEM analysis, the grain boundary phase had the following composition.
 Si oxide: 31.2% of $SiO_2$
 Al oxide: 24.4% of $Al_2O_3$
 Mn oxide: 0.5% of MnO
 Fe oxide: 0.7% of $Fe_2O_3$
 Ni oxide: 1.4% of NiO
 P oxide: 0.1% of $P_2O_5$
 Ba oxide: 29.3% of BaO
 Ti oxide: 12.2% of $TiO_2$
 Ca oxide: 0.1% of CaO
 Zr oxide: 0.1% of $ZrO_2$ In the accelerated life test, the capacitor had an effective life of 9.5 hours.

EXAMPLE 7

A multilayer chip capacitor of the structure shown in FIG. 2 was fabricated by the same procedure as in Example 5 except for the firing and heat treating conditions.
Firing
 Heating rate: 200° C./hour
 Holding temperature: 1320° C.
 Holding time: 4 hours
 Cooling rate: 300° C./hour
 Atmosphere: humid $N_2$ and $H_2$ gas mixture
 Oxygen partial pressure: $10^{-10}$ atm.
Heat treatment
 Holding temperature: 1100° C.
 Holding time: 2 hours
 Cooling rate: 300° C./hour
 Atmosphere: humid $N_2$ gas
 Oxygen partial pressure: $10^{-5}$ atm.

In the completed capacitor, the dielectric layers each were 20 μm thick and consisted essentially of grains having a mean particle size of 3.1 μm with the percent area of the grain boundary phase being 0.7%. The internal electrodes each were 2.5 μm thick.

On STEM analysis, the grain boundary phase had the following composition.
 Si oxide: 30.9% of $SiO_2$
 Al oxide: 25.3% of $Al_2O_3$
 Mn oxide: 0.6% of MnO
 Fe oxide: 0.1% of $Fe_2O_3$
 Ni oxide: 0.1% of NiO
 P oxide: 0.4% of $P_2O_5$
 Ba oxide: 30.0% of BaO
 Ti oxide: 11.9% of $TiO_2$
 Ca oxide: 0.1% of CaO
 Zr oxide: 0.6% of $ZrO_2$ An observation under SEM revealed the presence of a single oxide layer of 0.08 μm thick on the periphery of the internal electrodes. On STEM analysis, the oxide layer had the following composition.
 Mn oxide: 38.1% of MnO
 Ti oxide: 34.1% of $TiO_2$
 Fe oxide: 10.6% of $Fe_2O_3$
 Ni oxide: 9.6% of NiO
 Ba oxide: 4.2% of BaO
 P oxide: 1.4% of $P_2O_5$
 Si oxide: 1.3% of $SiO_2$
 Ca oxide: 0.5% of CaO
 Al oxide: 0.1% of $Al_2O_3$
 Zr oxide: 0.1% of $ZrO_2$ In the accelerated life test, the capacitor had an effective life of 14.7 hours.

EXAMPLE 8

A multilayer chip capacitor of the structure shown in FIG. 2 was fabricated by the same procedure as in Example 5 except that the following dielectric material was fired and heat treated under the following conditions.

Composition
  $[(Ba_{0.92}Ca_{0.08})O]_{1.004} \cdot (Ti_{0.83}Zr_{0.17})O_2$: 99.52%
  $SiO_2$: 0.18%
  MnO: 0.30%

Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-11}$ atm.

Heat treatment
  Holding temperature: 1100° C.
  Holding time: 3 hours
  Cooling rate 300° C./hour
  Atmosphere: humid $N_2$ gas
  Oxygen partial pressure: $10^{-5}$ atm.

In the completed capacitor, the dielectric layers each were 20 μm thick and consisted essentially of grains having a mean particle size of 2.7 μm with the percent area of the grain boundary phase being 0.6%. The internal electrodes each were 2.5 μm thick.

On STEM analysis, the grain boundary phase had the following composition.
  Si oxide: 28.4% of $SiO_2$
  Al oxide: 23.1% of $Al_2O_3$
  Mn oxide: 1.2% of MnO
  Fe oxide: 0.5% of $Fe_2O_3$
  Ni oxide: 0.6% of NiO
  P oxide: 0.4% of $P_2O_5$
  Ba oxide: 30.9% of BaO
  Ti oxide: 13.3% of $TiO_2$
  Ca oxide: 0.6% of CaO
  Zr oxide: 1.0% of $ZrO_2$ An observation under SEM revealed the presence of double oxide layers on the surfaces of the internal electrodes as shown in FIG. 2. The underlying and overlying oxide layers were 0.09 μm and 0.06 μm thick, respectively. On STEM analysis, the oxide layers had the following composition.

Underlying oxide layer 41
  Ba oxide: 71.2% of BaO
  P oxide: 22.5% of $P_2O_5$
  Ti oxide: 2.8% of $TiO_2$
  Ni oxide: 1.2% of NiO
  Fe oxide: 1.1% of $Fe_2O_3$
  Mn oxide: 0.7% of MnO
  Other oxides: 0.5%

Overlying oxide layer 45
  Ti oxide: 36.6% of $TiO_2$
  Mn oxide: 33.6% of MnO
  Fe oxide: 9.8% of $Fe_2O_3$
  Ni oxide: 7.1% of NiO
  Ba oxide: 5.9% of BaO
  P oxide 0.9% of $P_2O_5$
  Other oxides: 6.1%

In the accelerated life test, the capacitor had an effective life of 18.2 hours.

PREPARATIVE EXAMPLE 2

A multilayer chip capacitor was fabricated by the same procedure as in Example 5 except for the firing and heat treating conditions.

Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-8}$ atm.

Heat treatment
  Holding temperature: 1100° C.
  Holding time: 2 hours
  Cooling rate: 300° C./hour
  Atmosphere: humid $N_2$ gas
  Oxygen partial pressure: $10^{-5}$ atm.

In the completed capacitor, the dielectric layers each were 20 μm thick and contained grains having a mean particle size of 2.9 μm with the percent area of the grain boundary phase being 2.8%. The internal electrodes each were 2.5 μm thick. FIG. 11 is an SEM photomicrograph on a cross section of the dielectric layer showing that the grain boundary phase is more than in FIG. 10.

On STEM analysis, the grain boundary phase had the following composition.
  Si oxide: 25.4% of $SiO_2$
  Al oxide: 12.5% of $Al_2O_3$
  Mn oxide: 3.4% of MnO
  Fe oxide: 0.7% of $Fe_2O_3$
  P oxide: 0.3% of $P_2O_5$
  Ba oxide: 35.1% of BaO
  Ti oxide: 14.6% of $TiO_2$
  Ca oxide: 4.0% of CaO
  Zr oxide: 3.2% of $ZrO_2$
  Ni oxide: 0.7% of NiO An observation under SEM revealed the absence of an oxide layer on the internal electrodes. In the accelerated life test, the capacitor had an effective life of 1.4 hours.

The benefits of the invention are evident from the data of Examples 5.8 in comparison with these data of the comparative sample.

EXAMPLE 9

A dielectric layer-forming paste was prepared. There were provided the following powder stock materials.

| Ingredients | % by weight |
| --- | --- |
| $BaCO_3$ | 65.28 |
| $TiO_2$ | 23.72 |
| $ZrO_2$ | 7.49 |
| $CaCO_3$ | 2.88 |
| $SiO_2$ | 0.18 |
| $MnCO_3$ | 0.20 |

The powder stock materials were wet milled for 16 hours in an alumina ball mill. The mix was dried through a spray drier and then calcined in air at a temperature of 1200° C. for 3 hours, obtaining a barium titanate base dielectric material powder which had the following composition.
  $[(Ba_{0.92}Ca_{0.08})O]_{1.004} \cdot (Ti_{0.83}Zr_{0.17})O_2$: 99.52%
  $SiO_2$: 0.18%
  MnO: 0.30%

To the dielectric material was added 0.1% by weight of $P_2O_5$. The mix was wet pulverized for 16 hours in a ball mill, obtaining a barium titanate base dielectric material powder having a mean particle size of 1.4 μm.

A dielectric layer-forming paste was prepared by kneading the dielectric material powder with the following additives into a slurry by a three roll mill.

| Ingredients | Parts by weight |
|---|---|
| Dielectric material powder | 100 |
| Terpineol | 28 |
| Toluene | 14 |
| Dispersant | 0.2 |
| Lacquer | 36.5 |

Separately, an internal electrode-forming paste was prepared by kneading the following ingredients into a slurry by a three roll mill.

| Ingredients | % by weight |
|---|---|
| Ni | 44.6 |
| Terpineol | 52 |
| Ethyl cellulose | 3 |
| Benzotriazole | 0.4 |

A ceramic multilayer chip capacitor of a structure as shown in FIG. 1 was fabricated using these pastes. First, the dielectric layer and internal electrode-forming pastes were alternately applied in layer form by a printing method. The resulting stack included 20 dielectric layers. After cutting to a predetermined size, the stack was continuously subjected to binder removal, firing, and heat treatment under the following conditions.

Binder removal
  Heating rate: 50° C./hour
  Holding temperature: 800° C.
  Holding time: 2 hours
  Atmosphere: humid $N_2$ gas
  Oxygen partial pressure: $10^{-6}$ atm.
Firing
  Heating rate: 200° C./hour
  Holding temperature: 1340° C.
  Holding time: 2 hours
  Cooling rate: 300° C./hour
  Atmosphere: humid $N_2$ and $H_2$ gas mixture
  Oxygen partial pressure: $10^{-8}$ atm.
Heat treatment
  Holding temperature: 1000° C.
  Holding time: 2 hours
  Cooling rate: 300° C./hour
  Atmosphere: humid $N_2$ gas
  Oxygen partial pressure: $10^{-6}$ atm.

The atmosphere gas was moistened by means of a humidifier filled with water at 5°-75° C.

The sintered stack on the side surfaces was polished by sand blasting. In-Ga alloy was applied to opposed side surfaces to form external electrodes.

There was completed a ceramic multilayer chip capacitor having dimensions of 3.2 mm × 1.6 mm × 1.2 mm. The dielectric layers each were 16 μm thick and the internal electrodes each were 2.5 μm thick. The grains in the dielectric layers had a mean particle size of 3.0 μm.

An SEM photomicrograph on a cross section of the dielectric layer showed that the percent area of the grain boundary phase was 1.8% and no oxide layer was present on the internal electrodes.

On STEM analysis, the grain boundary phase in the dielectric layer had the following composition.
Si oxide: 30.7% of $SiO_2$
Al oxide: 25.4% of $Al_2O_3$
Mn oxide: 0.3% of MnO
Fe oxide: 1.3% of $Fe_2O_3$
Ni oxide 0.8% of NiO
P oxide: 0.3% of $P_2O_5$
Ba oxide: 30.1% of BaO
Ti oxide: 11.1% of $TiO_2$
Ca oxide: 0.1% of CaO
Zr oxide: 0.1% of $ZrO_2$ On STEM analysis, the grains in the dielectric layer had the following composition.
$[(Ba_{0.92}Ca_{0.08})O]_{1.004} \cdot (Ti_{0.83}Zr_{0.17})O_2$: 99.914%
$SiO_2$: 0.006%
MnO: 0.08%

The capacitor was subjected to an accelerated life test by applying a DC voltage of 200 volts at a temperature of 200° C. The effective life was 0.8 hours.

EXAMPLE 10

A multilayer chip capacitor was fabricated by the same procedure as in Example 9 except for the firing and heat treating conditions.
Additive
  $P_2O_5$: 0.1% by weight
Firing
  Heating rate: 200° C./hour
  Holding temperature: 1340° C.
  Holding time: 2 hours
  Cooling rate: 200° C./hour
  Atmosphere: humid $N_2$ and $H_2$ gas mixture
  Oxygen partial pressure: $10^{-8}$ atm.
Heat treatment
  Holding temperature: 1000° C.
  Holding time: 2 hours
  Cooling rate 300° C./hour
  Atmosphere: humid $N_2$ gas
  Oxygen partial pressure: $10^{-5}$ atm.

In the completed capacitor, the dielectric layers each were 16 μm thick and consisted essentially of grains having a mean particle size of 3.0 μm with the percent area of the grain boundary phase being 1.1%. The internal electrodes each were 2.5 μm thick. No oxide layer was formed on the periphery of the internal electrodes.

On STEM analysis, the grain boundary phase and grains in the dielectric layer had the following composition.
Grain boundary phase
  Si oxide: 31.6% of $SiO_2$
  Al oxide: 27.1% of $Al_2O_3$
  Mn oxide: 0.2% of MnO
  Fe oxide: 0.9% of $Fe_2O_3$
  Ni oxide: 0.9% of NiO
  P oxide: 0.1% of $P_2O_5$
  Ba oxide: 28.8% of BaO
  Ti oxide: 10.3% of $TiO_2$
  Zr oxide: 0.1% of $ZrO_2$
Grain $(Ba_{0.92}Ca_{0.08})O]_{1.004} \cdot (Ti_{0.83}Zr_{0.17})O_2$: 99.914%
  $SiO_2$: 0.006%
  MnO: 0.08%

In the accelerated life test, the capacitor had an effective life of 1.2 hours.

EXAMPLE 11

A multilayer chip capacitor of the structure shown in FIG. 2 was fabricated by the same procedure as in Example 9 except for the firing and heat treating conditions.
Additive P$_2$O$_5$: 0.15% by weight
Firing
  Heating rate: 200° C./hour
  Holding temperature: 1340° C.
  Holding time: 2 hours
  Cooling rate: 300° C./hour
  Atmosphere: humid N$_2$ and H$_2$ gas mixture
  Oxygen partial pressure: 10$^{-11}$ atm.
Heat treatment
  Holding temperature: 1100° C.
  Holding time: 3 hours
  Cooling rate: 300° C./hour
  Atmosphere: humid N$_2$ gas
  Oxygen partial pressure: 10$^{-5}$ atm.

In the completed capacitor, the dielectric layers each were 16 μm thick and consisted essentially of grains having a mean particle size of 3.4 μm with the percent area of the grain boundary phase being 1.6%. The internal electrodes each were 2.4 μm thick. Double oxide layers were formed on the periphery of the internal electrodes as shown at 41 and 45 in FIG. 2. The underlying and overlying oxide layers were 0.07 μm and 0.05 μm thick, respectively.

On STEM analysis, the grain boundary phase and grains in the dielectric layer had the following composition.
Grain boundary phase
  Si oxide: 32.4% of SiO$_2$
  Al oxide: 26.3% of Al$_2$O$_3$
  Mn oxide: 0.2% of MnO
  Fe oxide: 0.7% of Fe$_2$O$_3$
  Ni oxide: 0.7% of NiO
  P oxide: 0.1% of P$_2$O$_5$
  Ba oxide: 28.7% of BaO
  Ti oxide: 10.8% of TiO$_2$
  Zr oxide: 0.1% of ZrO$_2$
Grain
  [(Ba$_{0.92}$Ca$_{0.08}$)O]$_{1.004}$·(Ti$_{0.83}$Zr$_{0.17}$)O$_2$: 99.914%
  SiO$_2$: 0.006%
  MnO: 0.08%

On STEM analysis, the oxide layers had the following composition.
Underlying oxide layer 41
  Ba oxide: 68.6% of BaO
  P oxide: 23.2% of P$_2$O$_5$
  Ti oxide: 2.8% of TiO$_2$
  Fe oxide: 2.1% of Fe$_2$O$_3$
  Ni oxide: 1.8% of NiO
  Mn oxide: 0.8% of MnO
  Si oxide: 0.3% of SiO$_2$
  Al oxide: 0.2% of Al$_2$O$_3$
  Ca oxide: 0.1% of CaO
  Zr oxide: 0.1% of ZrO$_2$
Overlying oxide layer 45
  Ti oxide: 40.0% of TiO$_2$
  Mn oxide: 31.6% of MnO
  Fe oxide: 8.7% of Fe$_2$O$_3$
  Ni oxide: 7.9% of NiO
  Ba oxide: 3.8% of BaO
  Zr oxide: 3.8% of ZrO$_2$
  P oxide: 2.1% of P$_2$O$_5$
  Si oxide: 1.7% of SiO$_2$
  Al oxide: 0.3% of Al$_2$O$_3$
  Ca oxide: 0.1% of CaO In the accelerated life test, the capacitor had an effective life of 1.6 hours.

EXAMPLE 12

A multilayer chip capacitor of the structure shown in FIG. 2 was fabricated by the same procedure as in Example 9 except for the firing and heat treating conditions.
Additive
  P$_2$O$_5$: 0.1% by weight
Firing
  Heating rate: 200° C./hour
  Holding temperature: 1340° C.
  Holding time: 2 hours
  Cooling rate: 200° C./hour
  Atmosphere: humid N$_2$ and H$_2$ gas mixture
  Oxygen partial pressure: 10$^{-9}$ atm.
Heat treatment
  Holding temperature: 1000° C.
  Holding time: 2 hours
  Cooling rate: 300° C./hour
  Atmosphere: humid N$_2$ gas
  Oxygen partial pressure: 10$^{-5}$ atm.

In the completed capacitor, the dielectric layers each were 16 μm thick and consisted essentially of grains having a mean particle size of 3.2 μm with the percent area of the grain boundary phase being 0.9%. The internal electrodes each were 2.5 μm thick. A single oxide layer of 0.09 μm thick was formed on the periphery of the internal electrodes.

On STEM analysis, the grain boundary phase and grains in the dielectric layer had the following composition.
Grain boundary phase
  Si oxide: 28.4% of SiO$_2$
  Al oxide: 23.1% of Al$_2$O$_3$
  Mn oxide: 1.2% of MnO
  Fe oxide: 0.6% of Fe$_2$O$_3$
  Ni oxide: 0.6% of NiO
  P oxide: 0.4% of P$_2$O$_5$
  Ba oxide: 31.6% of BaO
  Ti oxide: 12.5% of TiO$_2$
  Ca oxide: 0.6% of CaO
  Zr oxide: 1.0% of ZrO$_2$
Grain
  [(Ba$_{0.92}$Ca$_{0.08}$)O]$_{1.004}$·(Ti$_{0.83}$Zr$_{0.17}$)O$_2$: 99.914%
  SiO$_2$: 0.006%
  MnO: 0.08%

On STEM analysis, the oxide layer had the following composition.
  Ba oxide: 75.3% of BaO
  P oxide: 19.3% of P$_2$O$_5$
  Ti oxide: 3.1% of TiO$_2$
  Mn oxide: 1.1% of MnO
  Fe oxide: 0.3% of Fe$_2$O$_3$
  Ca oxide: 0.3% of CaO
  Ni oxide: 0.2% of NiO
  Al oxide: 0.2% of Al$_2$O$_3$
  Si oxide: 0.1% of SiO$_2$
  Zr oxide: 0.1% of ZrO$_2$ In the accelerated life test, the capacitor had an effective life of 1.7 hours.

EXAMPLE 13

A multilayer chip capacitor of the structure shown in FIG. 2 was fabricated by the same procedure as in Example 9 except for the firing and heat treating conditions.
Additive
P$_2$O$_5$: 0.2% by weight
Firing
  Heating rate: 200° C./hour
  Holding temperature: 1340° C.
  Holding time: 2 hours
  Cooling rate: 200° C./hour
  Atmosphere: humid N$_2$ and H$_2$ gas mixture
  Oxygen partial pressure: 10$^{-12}$ atm.
Heat treatment
  Holding temperature: 1100° C.
  Holding time: 3 hours
  Cooling rate: 300° C./hour
  Atmosphere: humid N$_2$ gas
  Oxygen partial pressure: 10$^{-4}$ atm.

In the completed capacitor, the dielectric layers each were 16 μm thick and consisted essentially of grains having a mean particle size of 3.5 μm with the percent area of the grain boundary phase being 0.7%. The internal electrodes each were 2.5 μm thick. Double oxide layers were formed on the periphery of the internal electrodes as shown at 41 and 45 in FIG. 2. The underlying and overlying oxide layers were 0.09 μm and 0.06 μm thick, respectively.

On STEM analysis, the grain boundary phase and grains the dielectric layer had the following composition.
Grain boundary phase
  Si oxide: 32.5% of SiO$_2$
  Al oxide: 26.7% of Al$_2$O$_3$
  Mn oxide: 0.4% of MnO
  Fe oxide: 4 1.0% of Fe$_2$O$_3$
  Ni oxide: 1.0% of NiO
  Ba oxide: 27.0% of BaO
  Ti oxide: 11.4% of TiO$_2$
Grain
  [(Ba$_{0.92}$Ca$_{0.08}$)O]$_{1.004}$·(Ti$_{0.83}$Zr$_{0.17}$)O$_2$: 99.914%
  SiO$_2$: 0.006%
  MnO: 0.08%

On STEM analysis, the oxide layers had the following composition.
Ba oxide: 67.0% of BaO
P oxide: 24.1% of P$_2$O$_5$
Ti oxide: 3.3% of TiO$_2$
Fe oxide: 2.3% of Fe$_2$O$_3$
Ni oxide: 2.1% of NiO
Mn oxide: 0.6% of MnO
Si oxide: 0.2% of SiO$_2$
Ca oxide: 0.2% of CaO
Al oxide: 0.1% of Al$_2$O$_3$
Zr oxide: 0.1% of ZrO$_2$
Overlying oxide layer 45
  Ti oxide: 39.8% of TiO$_2$
  Mn oxide: 32.8% of MnO
  Fe oxide: 9.8% of Fe$_2$O$_3$
  Ni oxide: 7.2% of NiO
  Zr oxide: 3.6% of ZrO$_2$
  Ba oxide: 3.4% of BaO
  P oxide: 1.9% of P$_2$O$_5$
  Si oxide: 1.1% of SiO$_2$
  Al oxide: 0.2% of Al$_2$O$_3$
  Ca oxide: 0.2% of CaO The contents of P and Mn oxides in the underlying and overlying oxide layers were also examined by taking photographs under an electron radiation microanalyzer with a magnifying power of X2350.

Figure 5:
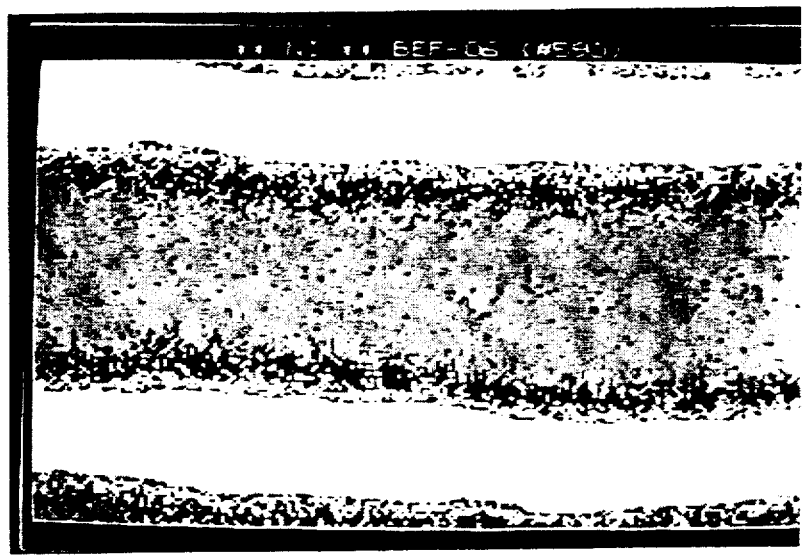

FIG. 5 is a microanalysis photo of focusing on Ni, in which nickel internal electrodes look as two white bands.

Figure 7:
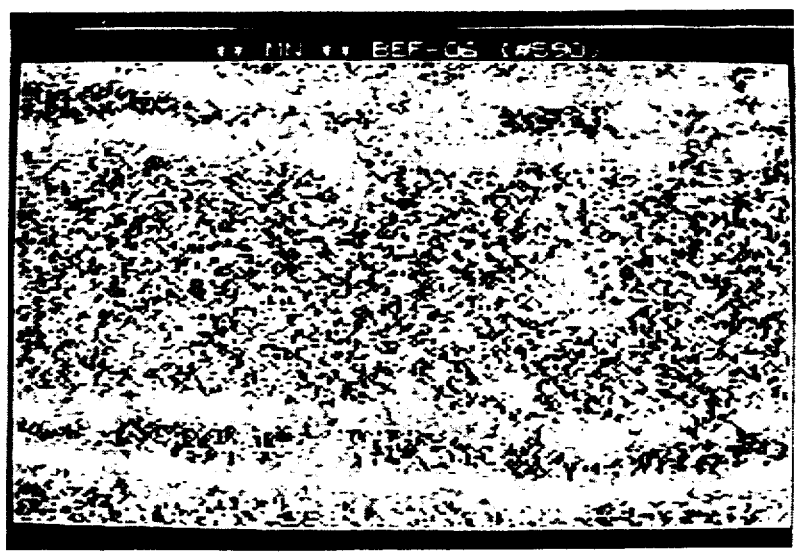

FIG. 7 is a microanalysis photo focusing on Mn in which Mn rich areas look as four white strips.

Figure 9:
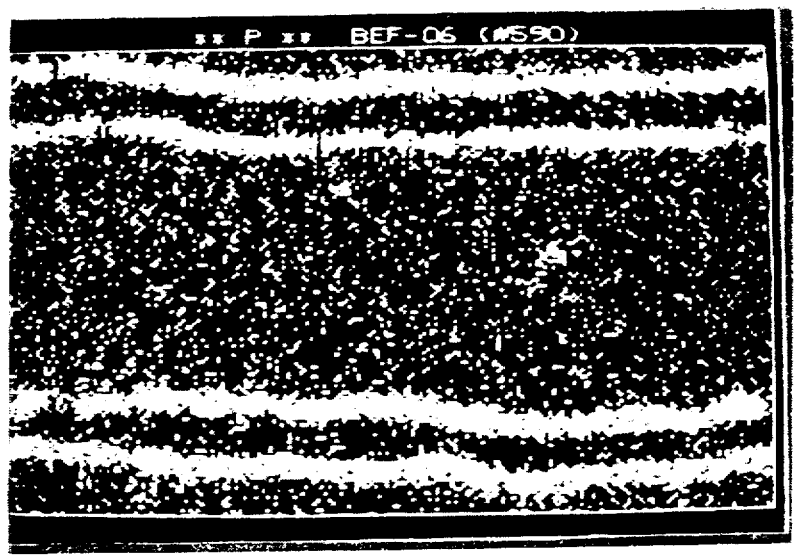

FIG. 9 is a microanalysis photo focusing on P in which P rich areas look as four white strips.

In the accelerated life test, the capacitor had an effective life of 3.4 hours.

EXAMPLE 14

A multilayer chip capacitor was fabricated by the same procedure as in Example 9 except for the additive and the firing and heat treating conditions.
Additive
V$_2$O$_5$: 0.1% by weight
Firing
  Heating rate: 200° C./hour
  Holding temperature: 1340° C.
  Holding time: 2 hours
  Cooling rate: 300° C./hour
  Atmosphere: humid N$_2$ and H$_2$ gas mixture
  Oxygen partial pressure: 10$^{-9}$ atm.
Heat treatment
  Holding temperature: 1000° C.
  Holding time: 2 hours
  Cooling rate: 300° C./hour
  Atmosphere: humid N$_2$ gas
  Oxygen partial pressure: 10$^{-6}$ atm.

In the completed capacitor, the dielectric layers each were 16 μm thick and consisted essentially of grains having a mean particle size of 3.3 μm with the percent area of the grain boundary phase being 1.7%. The internal electrodes each were 2.5 μm thick. No oxide layer was formed on the periphery of the internal electrodes.

On STEM analysis, the grain boundary phase and grains in the dielectric layer had the following composition.
Grain boundary phase
  Si oxide: 30.2% of SiO$_2$
  Al oxide: 25.6% of Al$_2$O$_3$
  Mn oxide: 0.7% of MnO
  Fe oxide: 0.3% of Fe$_2$O$_3$
  Ni oxide: 0.3% of NiO
  P oxide: 0.4% of P$_2$O$_5$
  Ba oxide: 29.7% of BaO
  Ti oxide: 12.0% of TiO$_2$
  Ca oxide: 0.2% of CaO
  Zr oxide: 0.6% of ZrO$_2$
Grain
  [(Ba$_{0.92}$Ca$_{0.08}$)O]$_{1.004}$·(Ti$_{0.83}$Zr$_{0.17}$)O$_2$: majority
  SiO$_2$: trace
  MnO: trace
  V$_2$O$_5$: trace In the accelerated life test, the capacitor had an effective life of 1.0 hours.

EXAMPLE 15

A multilayer chip capacitor was fabricated by the same procedure as in Example 14 except for the additive and the firing and heat treating conditions.
Additive
V$_2$O$_5$: 0.1% by weight
Firing
  Heating rate: 200° C./hour Holding temperature: 1340° C.
Holding time: 2 hours
Cooling rate: 200° C./hour
Atmosphere: humid $N_2$ and $H_2$ gas mixture
Oxygen partial pressure: $10^{-8}$ atm.
Heat treatment
Holding temperature: 1000° C.
Holding time: 2 hours
Cooling rate: 300° C./hour
Atmosphere: humid $N_2$ gas mixture
Oxygen partial pressure: $10^{-5}$ atm.

In the completed capacitor, the dielectric layers each were 16 μm thick and consisted essentially of grains having a mean particle size of 3.1 μm with the percent area of the grain boundary phase being 0.9%. The internal electrodes each were 2.5 μm thick. No oxide layer was formed on the periphery of the internal electrodes.

On STEM analysis, the grain boundary phase and grains in the dielectric layer had the following composition.
Grain boundary phase
Si oxide: 31.8% of $SiO_2$
Al oxide: 27.3% of $Al_2O_3$
Mn oxide: 0.3% of MnO
Fe oxide: 0.3% of $Fe_2O_3$
Ni oxide: 0.2% of NiO
Ba oxide: 28.5% of BaO
Ti oxide: 11.5% of $TiO_2$
Ca oxide: 0.1% of CaO
Grain
$[(Ba_{0.92}Ca_{0.08})O]_{1.004} \cdot (Ti_{0.83}Zr_{0.17})O_2$: majority
$SiO_2$: trace
MnO: trace
$V_2O_5$: trace In the accelerated life test, the capacitor had an effective life of 1.4 hours.

EXAMPLE 16

A multilayer chip capacitor of the structure shown in FIG. 2 was fabricated by the same procedure as in Example 14 except for the additive and the firing and heat treating conditions.
Additive
$V_2O_5$: 0.1% by weight
Firing
Heating rate: 200° C./hour
Holding temperature: 1340° C.
Holding time: 2 hours
Cooling rate: 300° C./hour
Atmosphere: humid $N_2$ and $H_2$ gas mixture
Oxygen partial pressure: $10^{-10}$ atm.
Heat treatment
Holding temperature: 1100° C.
Holding time: 2 hours
Cooling rate: 300° C./hour
Atmosphere: humid $N_2$ gas
Oxygen partial pressure: $10^{-6}$ atm.

In the completed capacitor, the dielectric layers each were 16 μm thick and consisted essentially of grains having a mean particle size of 3.6 μm with the percent area of the grain boundary phase being 1.6%. The internal electrodes each were 2.5 μm thick. A single oxide layer of 0.15 μm thick was formed on the periphery of the internal electrodes.

On STEM analysis, the grain boundary phase and grains in the dielectric layer had the following composition.
Grain boundary phase
Si oxide: 32.5% of $SiO_2$
Al oxide: 27.9% of $Al_2O_3$
Mn oxide: 0.6% of MnO
Fe oxide: 0.2% of $Fe_2O_3$
Ni oxide: 0.2% of NiO
Ba oxide: 27.6% of BaO
Ti oxide: 11.0% of $TiO_2$
Grain
$[(Ba_{0.92}Ca_{0.08})O]_{1.004} \cdot (Ti_{0.83}Zr_{0.17})O_2$: majority
$SiO_2$: trace
MnO: trace
$V_2O_5$: trace On STEM analysis, the oxide layer had the following composition.
Si oxide: 1.1% of $SiO_2$
Al oxide: 0.4% of $Al_2O_3$
Mn oxide: 32.4% of MnO
Fe oxide: 10.7% of $Fe_2O_3$
Ni oxide: 8.3% of NiO
P oxide: 2.1% of $P_2O_5$
Ba oxide: 3.9% of BaO
Ti oxide: 40.1% of $TiO_2$
Ca oxide: 0.8% of CaO
Zr oxide: 0.2% of $ZrO_2$ In the accelerated life test, the capacitor had an effective life of 2.1 hours.

EXAMPLE 17

A multilayer chip capacitor of the structure shown in FIG. 2 was fabricated by the same procedure as in Example 14 except for the additive and the firing and heat treating conditions.
Additive
$V_2O_5$: 0.1% by weight
Firing
Heating rate: 200° C./hour
Holding temperature: 1340° C.
Holding time: 2 hours
Cooling rate: 200° C./hour
Atmosphere: humid $N_2$ and $H_2$ gas mixture
Oxygen partial pressure: $10^{-5}$ atm.
Heat treatment
Holding temperature: 1100° C.
Holding time: 2 hours
Cooling rate: 300° C./hour
Atmosphere: humid $N_2$ gas
Oxygen partial pressure: $10^{-5}$ atm.

In the completed capacitor, the dielectric layers each were 16 μm thick and consisted essentially of grains having a mean particle size of 3.6 μm with the percent area of the grain boundary phase being 0.6%. The internal electrodes each were 2.5 μm thick. A single oxide layer of 0.11 μm thick was formed on the periphery of the internal electrodes.

On STEM analysis, the grain boundary phase and grains in the dielectric layer had the following composition.
Grain boundary phase
Si oxide: 31.2% of $SiO_2$
Al oxide: 23.0% of $Al_2O_3$
Mn oxide: 0.5% of MnO
Fe oxide: 0.1% of $Fe_2O_3$
Ba oxide: 32.3% of BaO
Ti oxide: 12.9% of $TiO_2$
Grain $[(Ba_{0.92}Ca_{0.08})O]_{1.004} \cdot (Ti_{0.83}Zr_{0.17})O_2$: majority
SiO$_2$: trace
MnO: trace
V$_2$O$_5$: trace On STEM analysis, the oxide layer had the following composition.
Si oxide: 0.9% of SiO$_2$
Al oxide: 0.2% of Al$_2$O$_3$
Mn oxide: 38.3% of MnO
Fe oxide: 11.3% of Fe$_2$O$_3$
Ni oxide: 9.8% of NiO
P oxide: 2.2% of P$_2$O$_5$
Ba oxide: 7.6% of BaO
Ti oxide: 29.2% of TiO$_2$
Ca oxide: 0.3% of CaO
Zr oxide: 0.2% of ZrO$_2$ In the accelerated life test, the capacitor had an effective life of 4.1 hours.

COMPARATIVE EXAMPLE 3

A multilayer chip capacitor was fabricated by the same procedure as in Example 9 except that P$_2$O$_5$ was not added and the firing and heat treating conditions were changed a little.
Additive
  None
Firing
  Heating rate: 200° C./hour
  Holding temperature: 1340° C.
  Holding time: 2 hours
  Cooling rate: 300° C./hour
  Atmosphere: humid N$_2$ and H$_2$ gas mixture
  Oxygen partial pressure: $10^{-8}$ atm.
Heat treatment
  Holding temperature: 1000° C.
  Holding time: 2 hours
  Cooling rate: 300° C./hour
  Atmosphere: humid N$_2$ gas
  Oxygen partial pressure: $10^{-6}$ atm.

In the completed capacitor, the dielectric layers each were 16 μm thick and consisted essentially of grains having a mean particle size of 3.0 μm with the percent area of the grain boundary phase being 2.6%. The internal electrodes each were 2.5 μm thick. No oxide layer was formed on the periphery of the internal electrodes.

On STEM analysis, the grain boundary phase and grains in the dielectric layer had the following composition.
Grain boundary phase
  Si oxide: 29.3% of SiO$_2$
  Al oxide: 24.2% of Al$_2$O$_3$
  Mn oxide: 0.6% of MnO
  Fe oxide: 0.3% of Fe$_2$O$_3$
  Ni oxide: 0.2% of NiO
  P oxide: 0.2% of P$_2$O$_5$
  Ba oxide: 33.2% of BaO
  Ti oxide: 11.8% of TiO$_2$
  Ca oxide: 0.1% of CaO
  Zr oxide: 0.1% of ZrO$_2$
Grain
  $[(Ba_{0.92}Ca_{0.08})O]_{1.004} \cdot (Ti_{0.83}Zr_{0.17})O_2$: 99.914%
  SiO$_2$: 0.006%
  MnO: 0.08%

In the accelerated life test, the capacitor had an effective life of 0.34 hours.

The benefits of the invention are evident from the data of Examples 9-17 in comparison with these data of the comparative sample.

EXAMPLE 18

Dielectric layer-forming pastes were prepared by the same procedure as in Example 9 except that the P$_2$O$_5$ was replaced by the following compounds. These compounds were added alone.

| Compound | % by weight |
|---|---|
| 1) LiCO$_3$ | 0.1% of Li$_2$O |
| 2) Y$_2$O$_3$ | 0.1% of Y$_2$O$_3$ |
| 3) Gd$_2$O$_3$ | 0.1% of Gd$_2$O$_3$ |
| 4) Tb$_4$O$_7$ | 0.1% of Tb$_2$O$_3$ |
| 5) Dy$_2$O$_3$ | 0.1% of Dy$_2$O$_3$ |
| 6) ZrO$_2$ | 0.1% of ZrO$_2$ |
| 7) MoO$_3$ | 0.1% of MoO$_3$ |
| 8) ZnO | 0.1% of ZnO |
| 9) CdO | 0.1% of CdO |
| 10) Tl$_2$O$_3$ | 0.1% of Tl$_2$O$_3$ |
| 11) SnO$_2$ | 0.1% of SnO$_2$ |

Using these dielectric-layer-forming pastes, multilayer chip capacitors were fabricated by the same procedure as in Example 9. There were obtained equivalent results to Examples 9 to 17. Also, equivalent results were obtained when a mixture of two or more of the foregoing compounds was added.

Although some preferred embodiments have been described, many modifications and variations may be made thereto in the light of the above teachings. It is therefore to be understood that within the scope of the appended claims, the invention may be practiced otherwise than as specifically described.

We claim:

1. A ceramic multilayer chip capacitor comprising internal electrodes of nickel or a nickel alloy, and dielectric layers stacked alternately with the internal electrodes,
  wherein an oxide layer of a different metal and having a different composition from said dielectric layer is formed on the periphery of each said internal electrode.

2. The capacitor of claim 1 wherein said oxide layer contains 1 to 99% by weight, calculated as MnO, of manganese oxide.

3. The capacitor of claim 1 wherein said oxide layer contains 0.1 to 99% by weight, calculated as P$_2$O$_5$, of phosphorus oxide.

4. The capacitor of claim 1 wherein said oxide layer contains 0.1 to 99% by weight, calculated as Fe$_2$O$_3$, of iron oxide.

5. The capacitor of any one of claims 1 to 4 wherein said oxide layer has a thickness of 0.01 to 1 μm.

6. The capacitor of claim 1 wherein said oxide layer includes a first layer containing 0.1 to 99% by weight, calculated as P$_2$O$_5$, of phosphorus oxide and a second layer containing 1 to 99% by weight, calculated as MnO, of manganese oxide.

7. The capacitor of claim 6 wherein said first layer has a thickness of 0.005 to 0.995 μm and said second layer has a thickness of 0.995 to 0.005 μm.

8. The capacitor of claim 1 wherein said dielectric layer comprises a dielectric oxide of the formula:

$$[(Ba_{1-x-y}Ca_xSr_y)O]_m \cdot (Ti_{1-z}Zr_z)O_2$$

wherein $0.05 \leq x \leq 0.25$, $0 \leq y \leq 0.05$, $0.05 \leq z \leq 0.20$, and $1.000 \leq m \leq 1.020$.

9. The capacitor of claim 8 wherein said dielectric layer further contains $SiO_2$.

10. A method for preparing a ceramic multilayer chip capacitor, comprising the steps of:
alternately stacking a dielectric material and an electrode-forming nickel or nickel alloy material to form a stack of dielectric layers and internal electrodes, said dielectric material containing 0.005 to 2% by weight, calculated as MnO, of a manganese compound and/or 0.005 to 5% by weight, calculated as $P_2O_5$, of a phosphorus compound based on the weight of the dielectric material,
firing the stack under an oxygen partial pressure of up to $10^{-8}$ atm., and
then heat treating the stack at a temperature of 900° to 200° C. under an oxygen partial pressure of at least $10^{-8}$ atm., thereby re-oxidizing the dielectric layers to form an oxide layer having a different composition from the dielectric layers in close proximity to the internal electrodes.

11. A ceramic multilayer chip capacitor comprising internal electrodes of nickel or a nickel alloy, and dielectric layers stacked alternately with the internal electrodes,
wherein the dielectric layers consist essentially of grains and a grain boundary phase, the percent area of the grain boundary phase being up to 2% of the area of a cross section of the dielectric layer.

12. The capacitor of claim 11 wherein the grain boundary phase is an oxide phase containing $Al_2O_3$ and $SiO_2$.

13. The capacitor of claim 12 wherein the grain boundary phase contains at least 15% by weight of $Al_2O_3$ and at least 15% by weight of $SiO_2$ based on the weight of the grain boundary phase.

14. The capacitor of claim 11 wherein said dielectric layer comprises a dielectric oxide of the formula:

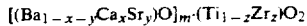

wherein $0.05 \leq x \leq 0.25$, $0 \leq y \leq 0.05$, $0.05 \leq z \leq 0.20$, and $1.000 \leq m \leq 1.020$.

15. The capacitor of claim 11 wherein an oxide layer having a different composition from said dielectric layer is formed on the periphery of each said internal electrode.

16. The capacitor of claim 15 wherein said oxide layer contains at least one member selected from oxides of Mn, P and Fe.

17. The capacitor of claim 15 wherein said oxide layer includes a first layer containing phosphorus oxide and a second layer containing manganese oxide.

18. A method for preparing a ceramic multilayer chip capacitor, comprising the steps of:
alternately stacking a dielectric material and an electrode-forming nickel or nickel alloy material to form a stack of dielectric layers and internal electrodes,
firing the stack under an oxygen partial pressure of up to $3 \times 10^{-9}$ atm., and
then heat treating the stack at a temperature of 900° to 1200° C. under an oxygen partial pressure of at least $10^{-8}$ atm., thereby re-oxidizing the dielectric layers such that the dielectric layers consist essentially of grains and a grain boundary phase, the percent area of the grain boundary phase being up to 2% of the area of a cross section of the dielectric layer.

19. A ceramic multilayer chip capacitor comprising internal electrodes of nickel or a nickel alloy, and dielectric layers stacked alternately with the internal electrodes,
said capacitor being prepared by alternately stacking a dielectric material and an internal electrode-forming material of nickel or nickel alloy, and firing the stack, said dielectric material comprising a dielectric oxide of the formula:

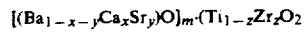

wherein $0.05 \leq x \leq 0.25$, $0 \leq y \leq 0.05$, $0.05 \leq z \leq 0.20$, and $1.000 \leq m \leq 1.020$, and 0.005 to 0.5% by weight, calculated as oxide on the basis of the weight of the dielectric material, of at least one component selected from the group consisting of oxides of Y, Gd, Tb, Dy, Zr, V, Mo, Zn, Cd, Tl, Sn and P and compounds which can be converted into these oxides by firing.

20. The capacitor of claim 19 wherein said dielectric material further contains at least one component selected from a lithium oxide and a lithium compound which can be converted into a lithium oxide by firing.

21. The capacitor of claim 19 which is prepared by firing the stack under an oxygen partial pressure of up to $10^{-7}$ atm., and then heat treating it at a temperature of 900° to 1200° C. under an oxygen partial pressure of at least $10^{-8}$ atm.

22. A ceramic multilayer chip capacitor comprising internal electrodes of nickel or a nickel alloy, and dielectric layers stacked alternately with the internal electrodes,
said capacitor being prepared by alternately stacking a dielectric material and an internal electrode-forming material of nickel or nickel alloy, firing the stack under an oxygen partial pressure of up to $10^{-7}$ atm., and heat treating the stack at a temperature of 900° to 1200° C. under an oxygen partial pressure of at least $10^{-8}$ atm.,
said dielectric material comprising a dielectric oxide of the formula:

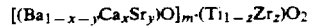

wherein $0.05 \leq x \leq 0.25$, $0 \leq y \leq 0.05$, $0.05 \leq z \leq 0.20$, and $1.000 \leq m \leq 1.020$, and 0.005 to 0.5% by weight, calculated as oxide on the basis of the weight of the dielectric material, of at least one component selected from a lithium oxide and a lithium compound which can be converted into a lithium oxide by firing.

23. The capacitor of any one of claims 19 to 22 wherein said dielectric material further contains at least one component selected from silicon oxide and manganese oxide.

24. The capacitor of claim 23 wherein the content of silicon oxide is 0.05 to 0.25% by weight and the content of manganese oxide is 0.01 to 0.50% by weight on the basis of the weight of the dielectric material.

25. The capacitor of claim 24 wherein the grain boundary phase is an oxide phase containing at least one member selected from the group consisting of $Al_2O_3$, $SiO_2$ and phosphorus oxide.

26. The capacitor of claim 23 wherein the dielectric layers consist essentially of grains and a grain boundary phase, the percent area of the grain boundary phase being up to 2% of the area of a cross section of the dielectric layer.

27. The capacitor of claim 19 or 22 wherein an oxide layer having a different composition from said dielectric layer is formed on the periphery of each said internal electrode.

28. The capacitor of claim 27 wherein said oxide layer contains at least one member selected from oxides of Mn, P and Fe.

29. The capacitor of claim 27 wherein said oxide layer includes a first layer containing phosphorus oxide and a second layer containing manganese oxide.

* * * * *

UNITED STATES PATENT AND TRADEMARK OFFICE
CERTIFICATE OF CORRECTION

PATENT NO. : 5,097,391
DATED : MARCH 17, 1992
INVENTOR(S) : TAKESHI NOMURA ET AL

It is certified that error appears in the above-identified patent and that said Letters Patent is hereby corrected as shown below:

Column 31, Claim 10, line 14, change "200°C" to --1200°C--.

Column 32, Claim 19, line 10, after "$_zZr_z$", insert --)--.

Signed and Sealed this

Twentieth Day of July, 1993

Attest:

MICHAEL K. KIRK

*Attesting Officer*     *Acting Commissioner of Patents and Trademarks*